US005495619A

United States Patent [19]
May et al.

[11] Patent Number: 5,495,619
[45] Date of Patent: Feb. 27, 1996

[54] APPARATUS PROVIDING ADDRESSABLE STORAGE LOCATIONS AS VIRTUAL LINKS AND STORING PREDEFINED DESTINATION INFORMATION FOR ANY MESSAGES TRANSMITTED ON VIRTUAL LINKS AT THESE LOCATIONS

[76] Inventors: Michael D. May, 9 Eaton Crescent, Clifton, Bristol BS8 2EJ; Brian J. Parsons, Flat 7, 7 Rodney Place, Clifton, Bristol BS8 4HY; Peter W. Thompson, 47 Wessex Avenue, Horfield, Bristol BS7 0DE; Christopher P. H. Walker, 35 Drakes Way, Portishead, Avon BS20 9LD, all of United Kingdom

[21] Appl. No.: 229,055

[22] Filed: Apr. 18, 1994

Related U.S. Application Data

[63] Continuation of Ser. No. 546,589, Jun. 29, 1990, abandoned.

[30] Foreign Application Priority Data

Jun. 30, 1989 [GB] United Kingdom ............... 8915136

[51] Int. Cl.⁶ ............................................. G06F 13/00
[52] U.S. Cl. ................... 395/800; 395/280; 370/58.1; 370/60; 364/927.94; 364/927.95; 364/942.08; 364/241.9; 364/238; 364/284.3; 364/DIG. 1
[58] Field of Search ................................ 395/800, 200, 395/325, 275; 340/825.03; 370/53, 54, 58.1, 60, 61, 85.4, 103

[56] References Cited

U.S. PATENT DOCUMENTS

| | | | |
|---|---|---|---|
| 4,419,728 | 12/1983 | Larson | 395/325 |
| 4,901,231 | 2/1990 | Bishop et al. | 395/325 |
| 4,905,231 | 2/1990 | Leung et al. | 370/94.1 |
| 4,914,653 | 4/1990 | Bishop et al. | 370/85.6 |
| 4,933,933 | 6/1990 | Dally et al. | 370/60 |
| 5,243,698 | 9/1993 | May | 395/200 |

FOREIGN PATENT DOCUMENTS

| | | |
|---|---|---|
| 0141659 | 4/1984 | European Pat. Off. . |
| 0125773 | 11/1984 | European Pat. Off. . |
| 1167762 | 10/1969 | United Kingdom . |

OTHER PUBLICATIONS

Microprocessors and Microsystems, vol. 13, No. 2, Mar. 1989, London GB pp. 113–123; A. Knowles: "Message Passing In A Transputer System."IEE Proceedings E. Computers & Digital Techniques. vol, 135, No. 3, May 1988, Stevenage GB pp. 137–150; W. Chen: "Superchip Architecture For Implementing Large Integrated Systems."

*Primary Examiner*—Thomas G. Black
*Assistant Examiner*—Williams, Drinks, et al

[57] ABSTRACT

A computer device comprises a processor for executing a plurality of concurrent processes each comprising a sequence of instructions, memory including RAM, at least one message link having input and output pins for connection to a device separate from said computer device and for transmitting message packets sequentially between the computer device and said separate device, and communication control circuitry coupled to said processor, to said memory, and to said message link. The memory provides a plurality of addressable virtual communication links. The communication control circuitry is operable:

(i) in response to execution of a message instruction by said processor to address a selected one of said virtual communication links and load into the selected one information regarding the message to be effected via the virtual communication link; and (ii) to control sequential transmission through said one message link of message packets relating to a plurality of virtual communication links.

A network of such computer devices and a method of operation is also described. The provision of virtual links enables several messages to be multiplexed down a single message link of the microcomputer.

38 Claims, 11 Drawing Sheets

FIG. 5
| ADDRESS | USAGE | REFERENCE |
|---|---|---|
| 1000 | PHYSICAL LINK QUEUE POINTER (DATA POSITION) | 8.1 |
| 1001 | PHYSICAL LINK QUEUE POINTER (ACKNOWLEDGE POSITION) | 8.2 |
| 1002 | CHANNEL HEADER POINTER | 8.3 |
| 1003 | OUTPUT DATA COUNT | 8.4 |
| 1004 | OUTPUTTING PROCESS DESCRIPTOR | 8.5 |
| 1005 | INPUTTING PROCESS DESCRIPTOR | 8.6 |
| 1006 | INPUT DATA COUNT | 8.7 |
| 1007 | CHANNEL BUFFER POINTER | 8.8 |
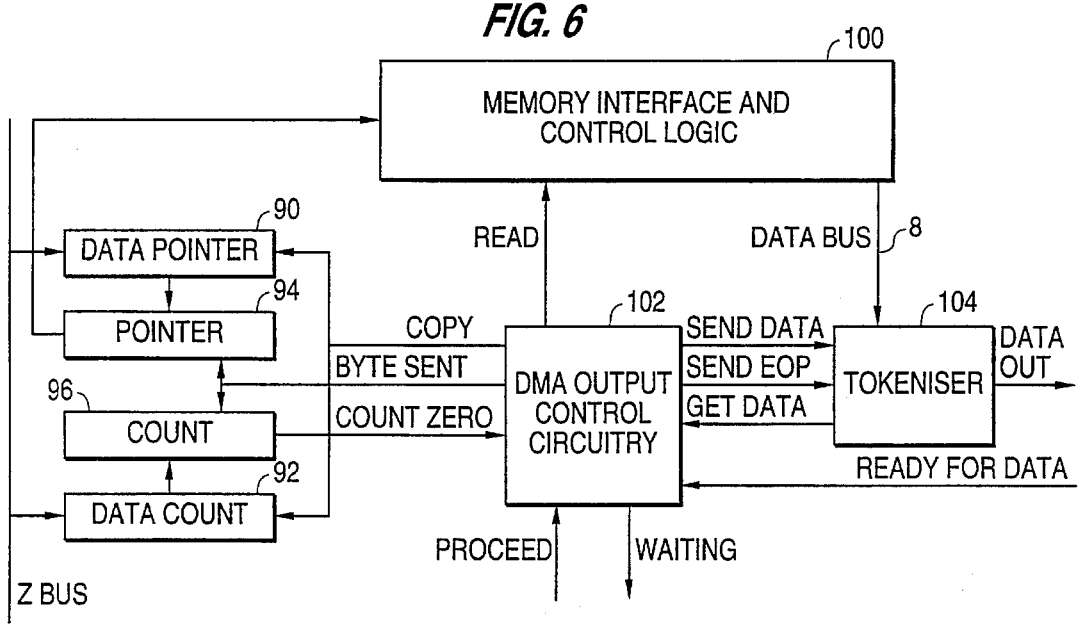
FIG. 6
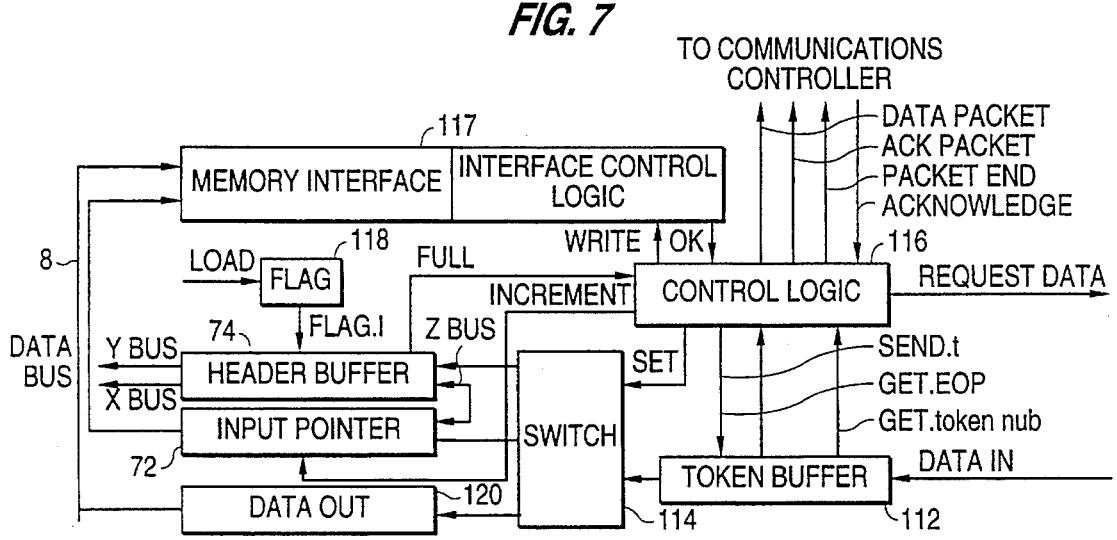
FIG. 7

APPARATUS PROVIDING ADDRESSABLE STORAGE LOCATIONS AS VIRTUAL LINKS AND STORING PREDEFINED DESTINATION INFORMATION FOR ANY MESSAGES TRANSMITTED ON VIRTUAL LINKS AT THESE LOCATIONS

This is a continuation of application Ser. No. 07/546,589 filed on Jun. 29, 1990, now abandoned.

FIELD OF THE INVENTION

This invention relates to a method for controlling communication between computers.

BACKGROUND TO THE INVENTION

Microcomputers are known which comprise, preferably on a single silicon chip, a processor and memory, the processor being able to operate in accordance with programmable instructions from the memory. A particular example of such a microcomputer is that described in U.S. Pat. No. 4,704,678. This microcomputer has four serial message links, each comprising a pair of unidirectional communication channels, each with a dedicated pin, permitting messages to be passed in opposite directions between the microcomputer and the device to which it is connected. This device could be another similar microcomputer, with the output pin and the input pin of the serial link of one microcomputer being connected respectively by unidirectional communication channels to the input pin and the output pin of the serial link of the other microcomputer. As the unidirectional communication channels are implemented by hard wiring or some other physical means they are called herein "hard channels".

Such microcomputers are capable of executing several concurrent processes, each process being a predetermined instruction set of a program which is to run on the microcomputer. The microcomputer carries out a number of processes together, sharing its time between them. Processes which are carried out together are called concurrent processes. At any time, only one of the processes is actually being executed by the microcomputer and this process is called the current process. Each concurrent process to be executed by the microcomputer uses a region of memory called a workspace for holding the local variables and temporary values manipulated by the process. The microcomputer permits communication not only between concurrent processes on the same microcomputer but, via the hard channels, also between processes on different microcomputers connected in a network. Whether between concurrent processes or between processes on different microcomputers, the microcomputer operates to provide synchronous process-to-process communication. This is described in detail in U.S. Pat. No. 4,704,678, the contents of which are herein incorporated by reference. A brief discussion is provided here to aid in understanding the present invention. As already indicated, the microcomputer may operate a number of concurrent processes. It therefore provides a system of scheduling to determine which process shall be performed at any particular time. The workspace of the current process and the workspaces of other processes waiting to be executed form a list in which one location of each workspace holds the workspace pointer of the next process on the list. The processor normally executes the processes on the list in sequence, advancing to a subsequent process when the current process is descheduled. The current process ceases to carry out further instructions and the processor moves onto the next process which has been identified by the address of the next process. A process often becomes descheduled because it has reached an instruction causing it to output data to a certain channel, identified by a channel number. Where the process intended to receive this data is on a different microcomputer, this would be a hard channel which interconnects microcomputers as described above. In order to allow communication between different processes carried out by the same microcomputer, a plurality of so-called soft channels are provided in the memory. Each soft channel consists of two word locations in memory, one for use in identifying the process wishing to use the channel and the second for holding the data to be communicated through the channel. The outputting process will not become rescheduled until the "inputting process", the process for which the data was intended, has received that data and returned an acknowledgement message to the outputting process. At that stage the process will become rescheduled and will be placed at the end of the list of processes awaiting execution. The inputting and outputting processes are called communicating processes.

It is clear from the above that the number of processes on a microcomputer which can communicate simultaneously with processes on other microcomputers is limited by the number of hard channels available. Also, where several processes require the same hard channel for communication, it is necessary to provide on each microcomputer a process whose function is to organise the use of each message link. It will be clear from the above that the links are responsible not only for receiving data and allocating it to the inputting process but also for the generation and return of acknowledgements to the outputting process. It is also necessary, when allocating processes to microcomputers in a network, processes which communicate must be located either on the same microcomputer or on microcomputers which are directly connected by a message link.

These are all restrictions which are presently accepted by current users and designers of microcomputer networks.

SUMMARY OF THE INVENTION

According to one aspect of the present invention there is provided, a computer device comprising a processor for executing a plurality of concurrent processes each comprising a sequence of instructions, memory including RAM, at least one message link having an input and an output for connection to a device separate from said computer device and for transmitting message packets sequentially between the computer device and said separate device, a plurality of addressable virtual communication links each provided by said memory, and communication control circuitry coupled to said processor, to said memory, and to said message link, said communication control circuitry being operable:

(i) in response to execution of a message instruction by said processor to address a selected one of said virtual communication links and load into the selected one information regarding the message to be effected via the virtual communication link; and (ii) to control sequential transmission through said one message link of message packets relating to a plurality of virtual communication links.

When a process wishes to send a message, the processor preferably outputs to the communication control circuitry a request to send a message, which request comprises an address portion identifying the virtual communication link via which the message is to be sent and a process descriptor identifying the process making the request.

The process descriptor preferably comprises a pointer to a memory location constituting the workspace of the sending process, and may also indicate the priority of the process. A pointer to the data to be sent can then be stored at a fixed offset location (known by the communication control cicuitry) from the workspace.

Preferably, the communication control circuitry is operable to permit messages to be transferred between the process being executed by said processor and a process being executed by a processor of the separate device in such a way as to implement synchronised process to process communication. By synchronised process to process communication is meant that the communicating processes are at corresponding program stages when message transmission is effected.

The memory can also provide communication channels to permit concurrent processes executed by said processor to communicate one with another. The communication channels similarly can permit synchronised process to process communication between the concurrent processes of the said processor. These communication channels can in one embodiment correspond to the soft channels described above with reference to U.S. Pat. No. 4,704,678. The determination as to whether a memory location is to act as a soft channel (for internal communication) or a hard channel (for external communication) is effected solely by the address of the memory location.

The computer device preferably comprises an integrated circuit on a single chip providing said processor, said memory and said communication control circuitry.

The invention provides in another aspect a network of such computer devices interconnected by their message links.

In a further aspect the invention provides a method of executing concurrent processes in a computer device having a processor, memory including RAM, communication control circuitry, and at least one message link having an input and an output connected to a device separate from the computer device for transmission of message packets between the computer and said separate device, which method comprises allocating a plurality of addressable memory locations as virtual communication links; executing a sequence of instructions including a plurality of message instructions; operating said communication control circuitry in response to execution of each of said message instructions to address a selectable virtual communication link and load into said selected link information regarding the message to be effected; and using said communication control circuitry to effect sequential transmission of message packets through one said message link.

Preferably, a queue of virtual communication links waiting to use a message link is formed by loading into each virtual communication link a pointer to the next virtual communication link thereby forming a linked list.

In the preferred embodiment each message link is arranged to provided synchronised process to process communication wherein each message packet which is output by execution of a processor on one computer device using one virtual link is acknowledged by an inputting device before transmission of a further message packet using the same virtual link.

Each virtual link waiting to use a message link can then adopt two positions in the linked list, a first position relating to the output of a data packet and a second position relating to the output of an acknowledgement packet.

Preferably, each virtual communication link has associated therewith a buffer memory location for storing an incoming message packet addressed to that virtual communication link. In this case, when a process is ready to receive a message, the processor issues a request to the communication control circuitry. The communication control circuitry responds to a request to receive a message by identifying the virtual link where the message is expected, ascertaining whether the buffer memory location associated with that virtual link contains data and, if it does, causing that data to be taken up by the processor or, if it does not, causing the process descriptor identifying the receiving process to be stored in the virtual communication link.

To simplify the control logic required for controlling the output and receipt of messages via the message link, and also to enable memory space for the virtual communication links to be preallocated each message can be divided into one or more message packets not exceeding a predetermined bit length. Messages sent by the processes executed by the processor contain data and are referred to herein as "data packets". Data packets can contain a data count identifying the length of the whole message.

Each virtual communication link can comprise respective memory locations to store the data counts of messages to be sent and of messages to be received. An acknowledgement for implementing synchronised process-to-process communication is issued only when transmission of a complete message has been effected.

The concept of the present invention can be used to control the outputting of both data packets and acknowledgement packets by using a queue pointer of each virtual link to identify the next virtual link in a queue awaiting a message link. To transmit a data packet a queue pointer for a virtual link points to one address but to transmit an acknowledgement packet a queue pointer points to a different address for that virtual link. In this way, there is a single queue for the outputting communication channel, with each virtual link having the ability to adopt two positions in the queue (one for a data packet and one for an acknowledgement packet).

The microcomputer can have a plurality of message links, with a set of virtual links committed to each particular output communication channel. Where a microcomputer is combined with a routing switch as described in U.S. Pat. No. 5,140,583, the contents of which are herein incorporated by reference, all messages are routed via the switch and so a single queue can be formed to serve all the message links.

Each virtual link can have a memory location identifying a packet header which is added to the message packet to be sent to identify its final destination when that destination is a virtual link on another microcomputer in the network.

By using the concept of addressable virtual communication links on each microcomputer in a network, several messages can be multiplexed down each hard link of the microcomputer and a microcomputer can communicate with a device which is not directly connected thereto, provided only that said device has similar addressable virtual communication channels. This means that it is not necessary to know the precise details of a network architecture when dividing a program into several processes to run on different microcomputers in the network. This makes the task of the programmer much easier.

Preferably, in a network of interconnected microcomputers, each virtual link on one microcomputer is paired with a virtual link on another microcomputer, which can be directly connected to said one microcomputer or connected thereto via a routing switch or a network of routing switches of the type described in U.S. Pat. Nos. 5,140,583 and 5,130,977. The virtual links are paired in the sense that each virtual link contains information identifying the paired recipient virtual link on the remote microcomputer so that message packets sent on that virtual link will always be directed to the paired recipient virtual link and acknowledgements issued via the recipient virtual link will be directed to return to the virtual link by which the message packet was originally transmitted. In this way, permanent channels are established at the direction of the programmer by loading the correct information into the virtual links when a network is established to run a given program. Hence, any network can be used to execute a given program and, conversely, any program can be run on a certain network. Also, there is no need to identify the sender of a message in the message itself, since the pair of virtual links are effectively dedicated to each other.

According to another aspect of the invention there is provided a method of encoding data for transmission in bit packets in which method each packet contains an equal number of ones and zeros, said packets being of a predetermined bit length and forming a finite set of the permutations of equal numbers of ones and zeros, wherein a first subset of said finite set is selected for use as data packets and a second, distinct, subset of said finite set is selected for use as control packets. This method is particularly suitable for message packets transmitted in accordance with the above aspects of the invention.

A specific embodiment wherein the data packets are six bits in length is described in U.S. Pat. No. 5,140,583 and is hereby incorporated by reference.

For a better understanding of the present invention and to show how the same may be carried into effect, reference will now be made by way of example to the accompanying drawings.

BRIEF DESCRIPTION OF THE DRAWINGS

FIG. 5 illustrates the structure of a virtual link control block;

FIGS. 6 and 7 are block diagrams of input and output direct memory accessors respectively;

DESCRIPTION OF THE PREFERRED EMBODIMENT

Figure 1:
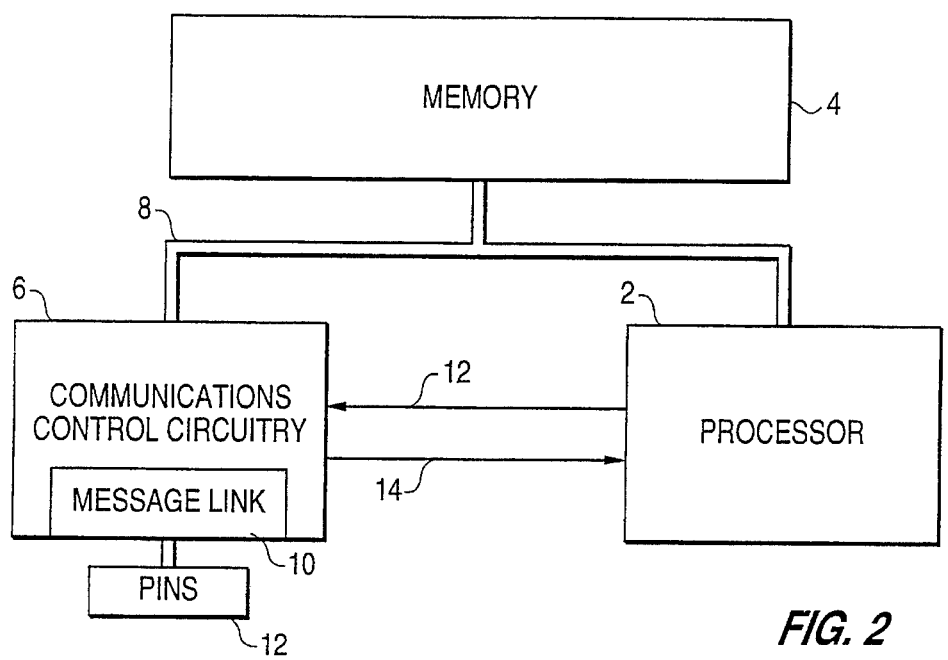
FIG. 1 is a block diagram of a computer device in accordance with an embodiment of the invention.

FIG. 1 shows the main components of a microcomputer which is formed on a single chip. The microcomputer comprises a processor 2, memory 4 including random access memory (RAM) coupled to the processor 2 and to communication control circuitry 6 via a data bus 8. The communication control circuitry is also termed herein a communication controller. The device also has a message link 10 having input and output pins designated generally by 12. Each pin is dedicated to a unidirectional serial communication channel. The processor 2 can communicate with the communication control circuitry 6 by a bidirectional pair of unidirectional channels 12, 14. The message link 10 transmits and receives messages in the form of message packets, for example serial bit packets, to and from the microcomputer to a separate device connected thereto. Each microcomputer can have several, e.g. four, message links.

Figure 2:
FIG. 2 shows the structure of a data packet.
Figure 15:
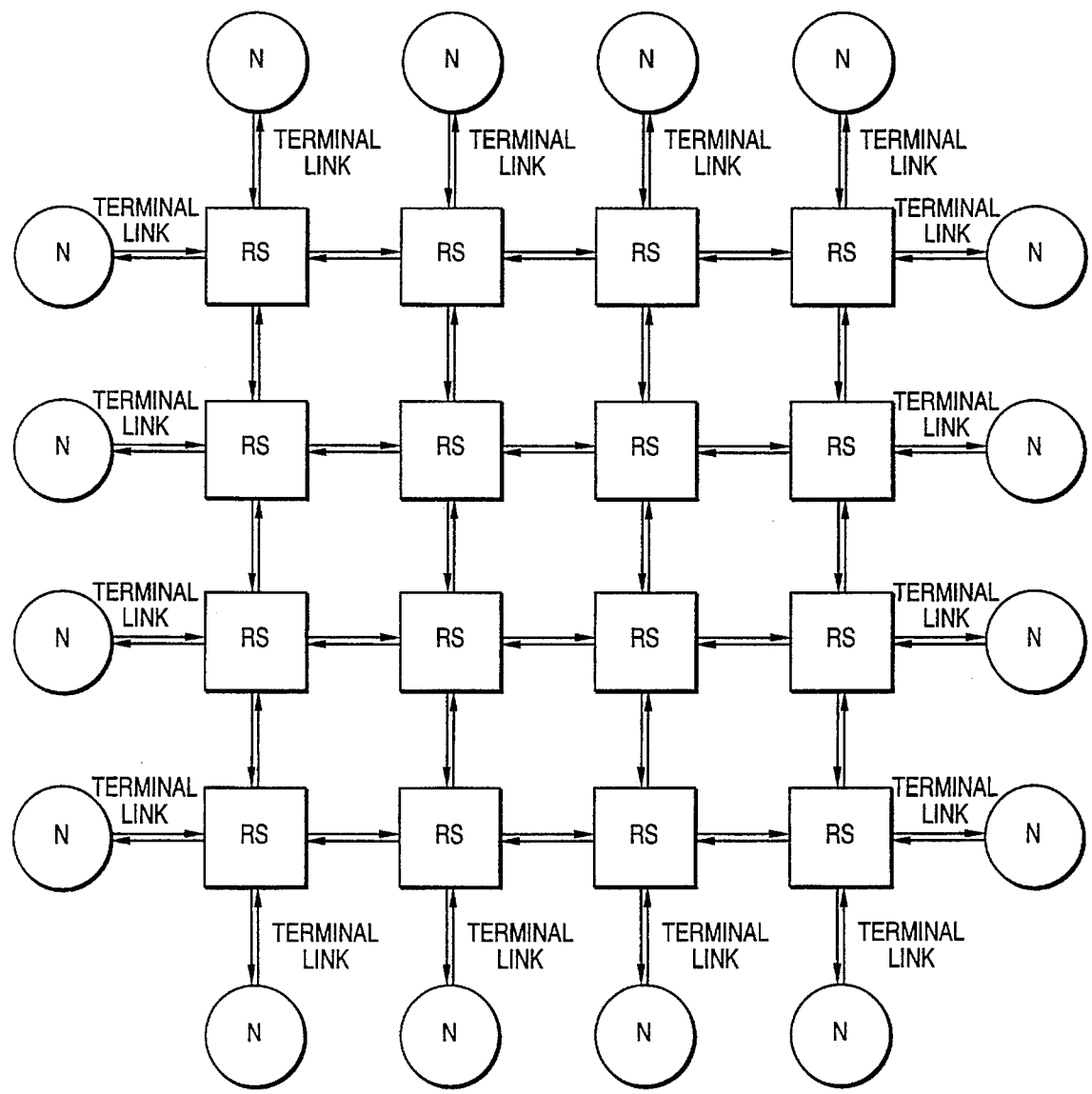
FIG. 15 is a diagram of a network.

The message links are used to connect the microcomputer to other devices in a network. These devices can be for example similar microcomputers or routing switches of the type described in U.S. Pat. Nos. 5,140,583 and 5,130,977. FIG. 15 shows such a network, where microcomputers are designated by N and routing switches by RS. The operation of the message link 10 is controlled by the communication control circuitry 6 to multiplex message transmission between processes being executed by processors on separate microcomputers in the network. Each message to be transmitted from a process being executed by one microcomputer in the network to a process being executed by a separate microcomputer in the network is divided by the communication control circuitry 6 of the microcomputer whose processor is executing the sending process into a plurality of data packets, each containing not more than a fixed maximum amount of data. These data packets contain extra information which identifies the destination of the packet. This information is termed herein a header portion as it is conveniently placed at the front of the packet. The structure of a data packet is shown in FIG. 2.

The random access memory of the memory 4 of the microcomputer provides a plurality of addressable virtual communication channels, which will be described in more detail hereinafter. Each virtual channel on one microcomputer in a network permits a message to be transmitted from a process being executed by that microcomputer to a separate microcomputer in the network and is paired with another virtual channel which permits communication in the reverse direction between processes executed respectively by those microcomputers. Each bidirectional pair of unidirectional virtual channels is termed herein a virtual link.

The term microcomputer used herein relates to small size computers generally based on single integrated circuit devices, but is not used exclusively to denote such devices.

As is known, the processor of a microcomputer can be used to execute a plurality of concurrent processes, each comprising a sequence of instructions. Such processes are capable of sending and receiving messages. Each virtual link is represented in the memory 4 by a control block comprising a plurality of memory locations. Each block stores information about the current progress of message transmission in both directions. This information preferably includes at least the process descriptors identifying processes sending and/or receiving messages. The message link 10 is shared by a plurality of virtual links by forming a queue of virtual links waiting to use a message link. This is done by loading into each virtual link a pointer to the next virtual link thereby forming a linked list. Each virtual link is capable of effecting transmission of both data packets and acknowledgement packets. Thus, at any time there may be either a data packet or an acknowledgement packet or both to be sent via the same virtual link. In the case that both an acknowledgement packet and a data packet are to be sent by the same virtual link, this virtual link adopts two positions on the linked list forming the queue waiting to use the message link 10.

Each virtual link control block either contains the additional information to be included with each packet sent on that virtual link or indicates where it may be found in the memory of the microcomputer. Associated with each virtual link is a memory location which is used to store a packet which arrives at that virtual link in the case that no process is waiting to receive that packet. The virtual link control block indicates where this location is. This location is termed hereinafter the virtual link buffer.

There follows a detailed description of the use of these virtual links to effect message transmission between microcomputers in a network. It will readily be appreciated from the following discussion that these microcomputers need not by any means be connected directly to one another but can be connected via routing devices in the network.

Response of the Communications Controller to i/o Requests by the Processor

If a process P1 being executed by the processor 2 of a microcomputer wishes to communicate with a process P2 on another microcomputer, the processor 2 of the first microcomputer sends a request to the communications controller 6 of the same microcomputer. Each request can be a request to send a message or a request to receive a message. Each request is accompanied by an identifer of the virtual link VLi on which the message is to be sent or from which it is to be received, the length of the message in bytes, and the process descriptor identifying the process making the request. Each request to send a message is also accompanied by an address (the data pointer) of the location in the memory 4 of the microcomputer at which the data to be sent begins. Each request to receive a message is also accompanied by an address of the location in memory at which the received message is to be stored. Assume for the following explanation that a process P1 being executed on one microcomputer wishes to transmit data to a process P2 being executed on a remote microcomputer.

Output Requests

When the processor 2 of a microcomputer makes a request to the communication controller 6 of the microcomputer to send a message on a particular virtual link VLi, the communication controller 6 stores the descriptor of the sending process P1 in the control block of the selected virtual link VLi, and stores the length of the message and the data pointer in the memory of the microcomputer also. It places the control block of that virtual link VLi on the back of a queue of virtual links waiting to use a message link 10 in a manner to be described hereinafter. When the virtual link is at the front of the queue for the use of a message link and the message link becomes available, the communication controller 6 removes the virtual link VLi from the queue, reads the length of the message and the pointer to the data to be sent from the memory of the microcomputer and causes a data packet, which includes a header portion supplied by the control block of the virtual link VLi, identifying the virtual link VLj on the remote microcomputer to which that data is to be sent, to be sent via the communications controller. If the amount of data to be sent is less than or equal to the maximum amount of data that can be contained in a packet, the whole of the message is sent in one packet. If the amount of data to be sent is greater than the maximum amount of data than can be contained in a packet, the first part of the message is sent in a packet containing the maximum amount of data. The communications controller 6 modifies the length of the message and the pointer to the data to be sent to reflect the fact that some or all of the message has been sent, and then stores them back in the memory of the microcomputer.

Input Requests

When the process P2 being executed by the processor 2 of the remote microcomputer makes a request to the communications controller 6 of the microcomputer to receive a message on a particular virtual link VLj, the communication controller 6 checks to see whether or not the buffer associated with the incoming virtual channel of that link is empty.

If the buffer associated with the virtual channel is empty, the communication controller 6 stores the identifier of the requesting process P2 in the control block of the selected virtual link VLj, and stores the length of the message and the address at which the data is to be written into the memory of the microcomputer.

If the buffer associated with the virtual channel is not empty, the communication controller 6 instructs the processor 2 of the microcomputer to copy the data stored in the buffer to the data storage area associated with the inputting process P2 and identified by the address in the request. If a process makes a request to receive a message on the virtual link after a packet has begun to be written into the buffer, the communication controller completes the writing of data into the buffer, and requests the processor to copy data from the buffer to the workspace of the inputting process. The communication controller then threads the virtual link VLi onto a queue for a message link so that an acknowledgement packet will be sent on the outgoing virtual channel of the link VLj with a header portion supplied by that virtual link identifying the virtual link VLi from which the packet was sent. If the count of the number of bytes to be received, which has been supplied to the communication controller by the process P2, is less than or equal to the maximum amount of data that can be contained in a packet, the data which was in the buffer must be the whole of the message. Since the message has been completely received the communication controller returns the descriptor of the inputting process P2 to the processor so that it can subsequently be executed. If the message has not been completely received, the communication controller stores the descriptor of the inputting process P2 in the control block of the selected virtual link, and stores in the memory of the microcomputer the length of the message remaining and the address of the next position at which data is to be written.

Response of the Communications Controller to the Arrival of a Packet

When a packet arrives on a message link 10, the communication controller 6 extracts the header portion identifying the virtual link from the additional information contained in the packet.

Data Packet

If the packet also contains data, the communication controller inspects the control block of the identified virtual link VLj to see whether there is stored a process descriptor of a process P2 waiting to receive a message on this virtual link.

If there is a process P2 waiting to receive a message, the communication controller reads the stored address of the data storage area of the process P2 and causes the data in the packet to be written into the data area of that process starting from the relevant memory location. The communication controller threads the control block of the virtual link VLj onto a queue for a message link so that an acknowledgement packet will be sent on the outgoing virtual channel of the link VLj to the virtual link VLi. The communication controller reads the stored count of the number of bytes to be received. If the count of the number of bytes to be received is less than or equal to the maximum amount of data that can be contained in a packet, the data which is in the packet must be the whole of the message. Since the message has been completely received the communication controller returns the descriptor of the inputting process P2 which is stored in the virtual link VLj to the processor so that it can subsequently be executed. The communication controller also stores a null process descriptor in the virtual link VLj in place of the descriptor of the inputting process. If the message has not been completely received, the communication controller decreases the count of the length of the message remaining by the maximum amount of data which can be contained in a packet and increases the address of the next memory location at which data is to be written in the memory of the microcomputer by the same amount. The communication controller stores the updated length and address back in the memory of the microcomputer.

If there is no such process waiting to receive a message on the virtual link VLj the communication controller inspects the virtual link control block to obtain the location of the buffer associated with the virtual link. The communication controller then causes the data of the incoming packet to be written into that buffer. As described above, if a process makes a request to receive a message on the virtual link after a packet has begun to be written into the buffer, the communication controller completes the writing of data into the buffer, and requests the processor to copy the data from the buffer to the workspace of the inputting process. The communication controller threads the virtual link control block onto a queue for a message link so that an acknowledgement packet will be sent on the outgoing virtual channel of the link. If the count of the number of bytes to be received, which has been supplied to the communication controller by the processor, is less than or equal to the maximum amount of data that can be contained in a packet, the data which is in the packet must be the whole of the message. Since the message has been completely received the communication controller returns the descriptor of the inputting process to the processor so that it can subsequently be executed. If the count of the number of bytes to be received, which has been supplied to the communications controller by the processor, is greater than the maximum amount of data that can be contained in a packet, the data which is in the packet cannot be the whole of the message. Since the message has not been completely received, the communications controller stores the descriptor of the inputting process in the control block of the selected virtual link, and stores in the memory of the microcomputer the length of the message remaining and the address to the next location at which data is to be written.

Acknowledge Packet

If there is no data contained in the arriving packet, the communication controller treats the packet as an acknowledgement that a previous data packet sent from the process P1 by the virtual link VLi has been received by the inputting process P2. The communication controller reads from the memory of the microcomputer the count of the number of bytes of the message from process P1 still to be sent via the selected virtual link VLi.

If the count of the number of bytes still to be sent is not zero, the communication controller threads the virtual link VLi back onto a queue for a message link so that another data packet of that message from process P1 will be sent on the outgoing virtual channel of the link.

If the count of the number of bytes still to be sent is zero, the message sent by process P1 has been completely received by process P2, and so the communications controller reads the descriptor of the sending process P1 which is stored in the virtual link VLi, and checks that the transmission of the packet which has just been acknowledged is complete returns the descriptor to the processor so that this process can subsequently be executed. The communication controller also stores a null process descriptor in the virtual link VLi. In this way synchronised process to process communication can be effected between processors on remote computers.

Exchange of Data between the Processor and the Communication Controller

In order that the execution of a process by the processor 2 of the microcomputer can cause a message to be sent to another microcomputer, the processor must interact with the communication controller 6. To this end there is a logical channel 12 from the processor 2 to the communication controller 6. In order that the communication controller 6 can signal the completion of messages to the processor 2 there is also a logical channel 14 in the opposite direction. Each of the logical channels 12, 14 comprises a set of signals. The main data bus of the microcomputer is used to communicate word-length values once synchronisation has been achieved by means of the signal channels.

The control signals are of two types: requests and responses. Requests are sent autonomously by both the processor 2 and the communication controller 6, and responses are sent after receiving requests and data.

Whenever the processor 2 sends a request to the communication controller 6 on the logical channel 12 it waits for an response on the other channel 14. Whenever the communication controller 6 sends a request to the processor 2 on the logical channel 14 it waits for a response on the other channel 12. This enables the communication controller 6 to regulate the flow of data from the processor 2, and also enables the processor 2 to regulate the flow of data values from the communication controller 6.

Since the processor 2 and the communication controller 6 operate independently and perform actions which may take variable lengths of time, both of them may send a request to the other at the same time. Consequently, one of them must be prepared to abandon its own request and respond to the other, otherwise deadlock will occur. In the preferred embodiment, the processor abandons its request if it receives a request instead of a response from the communication controller.

When a process P1 that is being executed by the microcomputer wishes to send a message to a process P2 on another microcomputer, the processor sends a request to the communications controller whose value means "output". When this request is acknowledged by the communication controller the processor sends the identifier of the virtual link VLi that the process wishes to use. When that is acknowledged by the communication controller, the processor sends the data pointer, i.e. the address of the base of the block of data to be transmitted. When that is acknowledged by the communication controller, the processor sends the number of bytes of data to be transmitted, which must be greater than zero. When that is acknowledged by the communication controller, the processor sends the descriptor of the sending process. When that is acknowledged by the communication controller the processor then proceeds to execute another process. It will be appreciated that the data pointer comprising the address of the base of the data area and the count of the number of bytes of data to be transmitted could be replaced by a pointer to the base of the block of data and a pointer to the top of the block of data, or a pointer to the top of the block of data and a count of the number of bytes of data to be transmitted, without materially affecting the overall operation.

When and if a message that the process P1 requests to be sent has been transmitted to a process P2 on another microcomputer and that microcomputer has acknowledged receipt of the message, the communication controller of the first microcomputer will send a request to the processor of the first microcomputer. When that processor acknowledges the request, the communication controller sends to the processor the descriptor of the sending process P1 which was sent from the processor to the communication controller when the processor requested that the message be sent.

When a process P2 that is being executed by the microcomputer wishes to receive a message from a process P1 on another microcomputer, the processor sends a request to the communication controller whose value means "input". When this request is acknowledged by the communication controller the processor sends the identifier of the virtual link VLj the process P2 wishes to use. When that is acknowledged by the communication controller 6, the processor 2 sends a pointer to the base of the data area into which the received data is to be loaded. When that is acknowledged by the communication controller 6, the processor 2 sends the number of bytes of data to be received, which must be greater than zero. It will be appreciated that the pointer to the base of the data area and the count of the number of bytes of data to be received could be replaced by a pointer to the base of the data area and a pointer to the top of the data area, or a pointer to the top of the data area and a count of the number of bytes of data to be received, without materially affecting the overall operation. When the number of bytes is acknowledged by the communication controller, the processor sends the descriptor of the process P2.

There are now two possibilities. If the communication controller responds with an acknowledge, the processor then proceeds to execute another process. Alternatively, the communication controller may respond to the receipt of the virtual link identifier from the processor with a control value meaning "move data". The processor 2 acknowledges this, and then the communication controller 6 sends a pointer to the base of the block of data to be moved. The processor 2 acknowledges this and the communication controller 6 sends a count of the amount of data to be moved. The processor 2 acknowledges this and then copies the amount of data requested by the communication controller 6, starting from the pointer given by the communication controller, to the data storage area whose base is pointed to by the pointer already sent to the communication controller. The processor then proceeds to execute another process. It will be appreciated that the pointer to the base of the data to be moved and the count of the number of bytes of data to be moved could be replaced by a pointer to the base of the block of data and a pointer to the top of the block of data, or a pointer to the top of the block of data and a count of the number of bytes of data to be moved, without materially affecting the overall operation.

It will be appreciated that this protocol removes the need for the communication controller to be able to copy data from one part of the microcomputer's memory to another, provided that the processor is able to do so. In the case of the microcomputer described in U.S. Pat. No. 4,704,678, the processor is able to copy data very efficiently.

When and if a message that the processor requests to be received has been received from another microcomputer the communication controller of the first microcomputer will send a request to the processor of the first microcomputer. When that processor acknowledges the request, the communication controller sends to the processor the process descriptor which was sent from the processor to the communication controller when the processor requested that the message be received.

The arrangement whereby the processor of a microcomputer ceases to execute a process after that process has requested an input or output of a message on a logical channel and only resumes execution of that process after the communication controller returns the descriptor of the process ensures that from the view of each process, message transmission is fully synchronised, in that two processes which exchange a message can only proceed after the message has been completely transmitted from one to the other.

Division of Arbitrary Length Messages into Packets

It will be clear from the above that the messages which are sent from a process P1 on one microcomputer to a process P2 on another microcomputer may be of arbitrary length. The communication controller splits each message which it has been asked to send by the process of the microcomputer into a plurality of packets, and interleaves the packets of different messages on each message link, in order to give the appearance of all the messages being transmitted simultaneously.

In order that packets which are parts of different messages can be distinguished by the communication controller of the microcomputer which receives them, each packet must contain information additional to the portion of the message that the data packet represents. Because processes are only permitted to communicate via pre-allocated virtual channels, it is sufficient for the additional information contained in the packet when it is received to identify an input virtual channel of the receiving microcomputer. When the packet is transmitted it may also contain information to route the packet through a packet switching network, for example one composed of routing switches described in U.S. Pat. No. 5,140,583. This routing information may be incorporated into the identification of the input channel of the receiving microcomputer or else discarded by a routing switch before the packet is received by a microcomputer. The combination of any routing information and the identification of the virtual input channel VLj of the receiving microcomputer identifies the virtual output channel VLi of the sending microcomputer.

Including virtual channel information in the data packets enables an arbitrary number of channels to be multiplexed on each message link, up to the limit imposed by the amount of virtual channel information contained in the packets. Moreover the number of virtual channels multiplexed on each communications device can vary from moment to moment.

The amount of data contained in a packet has a maximum limit. Each message is divided by the communication controller into a sequence of one or more packets. All but the last of these packets contains the maximum amount of data, and the last contains the maximum amount of data or less. The advantage of this division of messages into packets is that, in the case that several DMAs are supplied with work from a single queue, it is possible to securely overlap the transmission of more than one packet of the same message.

In the preferred embodiment messages are an arbitrary number of bytes. Packets contain one or two "header" bytes which are interpreted by the receiving microcomputer as the number of the virtual input channel. The choice between one or two bytes is determined by a flag 118 (FIG. 7 described hereinafter) in the communication controller. Packets contain a maximum number of bytes of data which in the preferred embodiment is 32. It will be appreciated that this limit could be set by the value of a register in the communication controller.

Since short messages (and the last parts of long messages) may not occupy a whole packet, and the routing information may be of arbitrary length, there must be information to say where the packet ends. In the preferred embodiment this information is encoded into the lower-level protocol used by the message links, discussed hereinafter. This protocol may be of the type discussed with reference to the link modules in the routing switch of U.S. Pat. No. 5,140,583. It will be appreciated that, if the protocol used by the message links does not allow such an encoding, an explicit count of the length of each packet could be included in the information additional to the data in the packet.

In the preferred embodiment each packet has a structure illustrated in FIG. 2. This figure is to be read from left to right. The header has bytes of routing and channel information which are transmitted first, followed by the data bytes of the packet, followed by the encoded end of packet signal.

It will be appreciated that every packet which is part of a message must contain at least one byte of data, but the general format of packets allows zero bytes of data to be sent. Packets containing only routing and channel information, with a null data section, are interpreted as acknowledgement packets.

Process to Process Communication

The communication controller 6 of a microcomputer sends the first packet of message via a virtual channel VLi to another microcomputer after it receives the request for the message to be sent from the processor P1 being executed by the processor 2 of the first microcomputer, irrespective of whether any process on the second microcomputer has yet performed an input on the associated input virtual channel VLj. When the second microcomputer receives the packet, it identifies the virtual channel VLj on which the packet is sent from the additional information contained in the packet. If a process P2 on the second microcomputer has executed an input instruction on that virtual channel VLj, the data contained in the packet is stored in the data space of the inputting process P2. If no process has yet performed an input on that virtual channel, the data contained in the packet is stored in a buffer associated with the virtual channel. If a process P2 on the second microcomputer subsequently performs an input on that virtual channel VLi, the data contained in the buffer associated with the channel VLj is copied into the data space of the process P2. As described above, the protocol between the communication controller and the processor of the microcomputer ensures that this copying is done by the processor.

The buffer associated with an input virtual channel of a microcomputer is large enough to contain a whole packet of data, so that no data is lost if a packet arrives before a process has performed an input on that channel. In the preferred embodiment, the buffer is a region of the memory of the microcomputer which is allocated for the purpose of buffering a packet of data, possibly by a compiler. The limit on the amount of data carried by any one packet enables the maximum size of buffer required to be determined. A buffer of smaller size than the maximum may be used if a virtual channel is to be used only for messages of a known size, which is less than the maximum amount of data in one packet.

In order that the data contained in a buffer is not overwritten, the communication controller of a microcomputer which has sent one packet of a message on a virtual channel VLi to another microcomputer does not send another packet on that channel VLi until it receives an acknowledgment that the first packet has been stored in the data storage space of a process on the second microcomputer. The acknowledgement is a packet sent by the communication controller of the second microcomputer via a virtual channel VLj to the first microcomputer. This second virtual channel VLj is associated with the first logical channel VLi by the communication controllers of both microcomputers. Thus virtual channels between microcomputers are always paired so that acknowledgements can be sent in response to packets received by a process.

Each virtual channel of an associated pair of virtual channels between two microcomputers can carry both data packets and acknowledge packets provided that the two kinds of packet can be distinguished by the communication controllers of the two microcomputers. In the preferred embodiment, acknowledgement packets are packets containing only routing and logical channel information, but no data. The communication controller can distinguish such packets because the end of packet signal is received without any data having been received.

When the first packet of a message has arrived on a virtual channel VLj into a microcomputer and a process P2 on that microcomputer has performed an input on that channel, an acknowledgement packet is sent back to the microcomputer that sent the packet by the communication controller of the microcomputer that received the packet. If the process executes an input instruction on the virtual channel before any packet arrives on that virtual channel, the acknowledgement packet will be sent when a packet arrives on that virtual channel. If the packet arrives before any process has executed an input instruction on the virtual channel, an acknowledgement packet will be sent as soon as a process performs an input on that virtual channel.

Structure of Virtual Link Control Blocks

An example of a virtual link control block which might be used in a 32 bit microcomputer device is shown in FIG. 5. This is a block of 8, 32-bit words which starts at an exact multiple of 8 words from a base location of the memory 4. Addresses are given using zero as the base of memory. The block can be threaded onto linked lists using the two queue pointers (8.1) and (8.2). The channel header pointer (8.3) is a pointer to the header information to be included in each packet sent on this virtual link. The output data count (8.4) is the count of the number of bytes of data remaining to be sent from the virtual links. The outputting process descriptor (8.5) contains the descriptor of the process currently sending a message on the virtual link, or else the special null process value NotProcess.p if there is currently no such process. The inputting process descriptor (8.6) is the descriptor of the process currently receiving a message on the critical link or else the special null process value if there is no such process. The inputting process count (8.7) is the count of the number of bytes of data remaining to be received on the virtual link. The channel buffer pointer (8.8) is a pointer to the buffer for containing a packet which arrives when there is no current inputting process.

Figure 3:
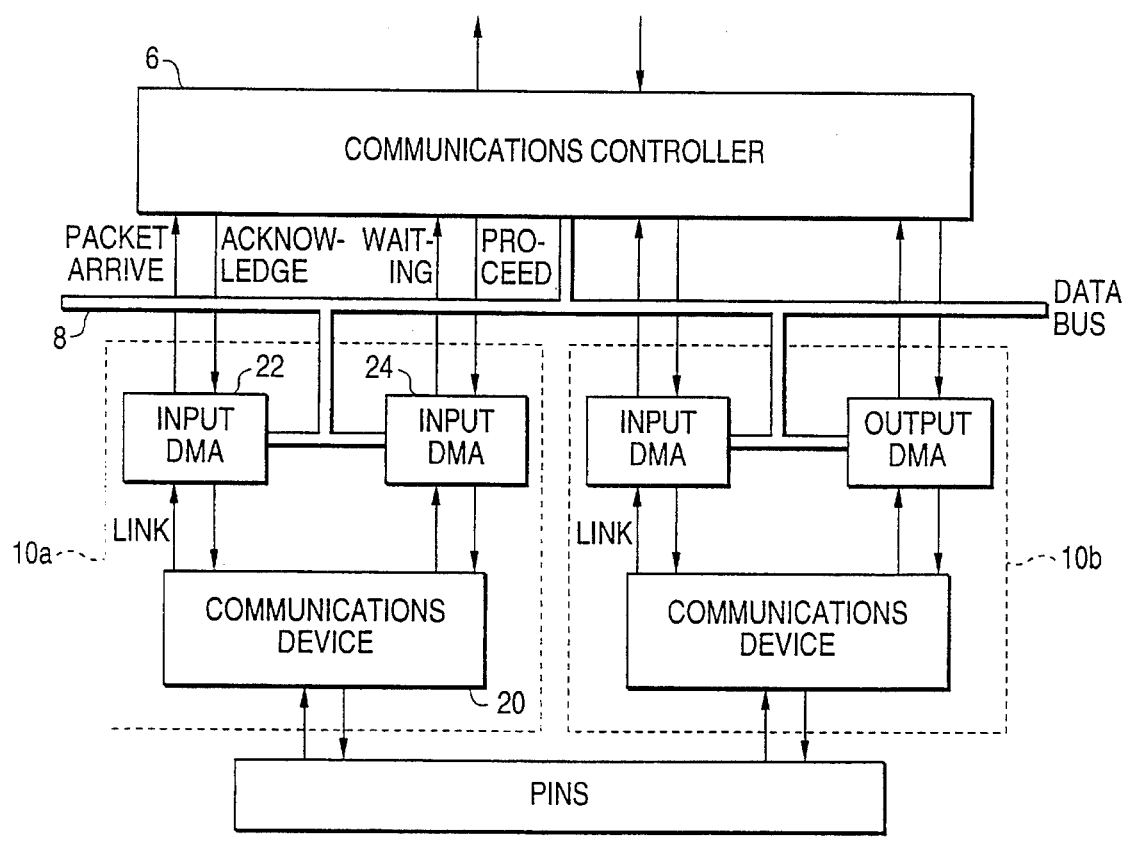
FIG. 3 is a block diagram of a computer device showing the message links in more detail.

FIG. 3 is a block diagram showing the structure of a message link in more detail. Two message links 10a, 10b are shown, each comprising a communications device 20 in communication with input and output direct memory accessors (DMAs) 22, 24. The DMAs 22, 24 also communicate with the communication controller as described hereinafter.

Communication Controller

Figure 4:
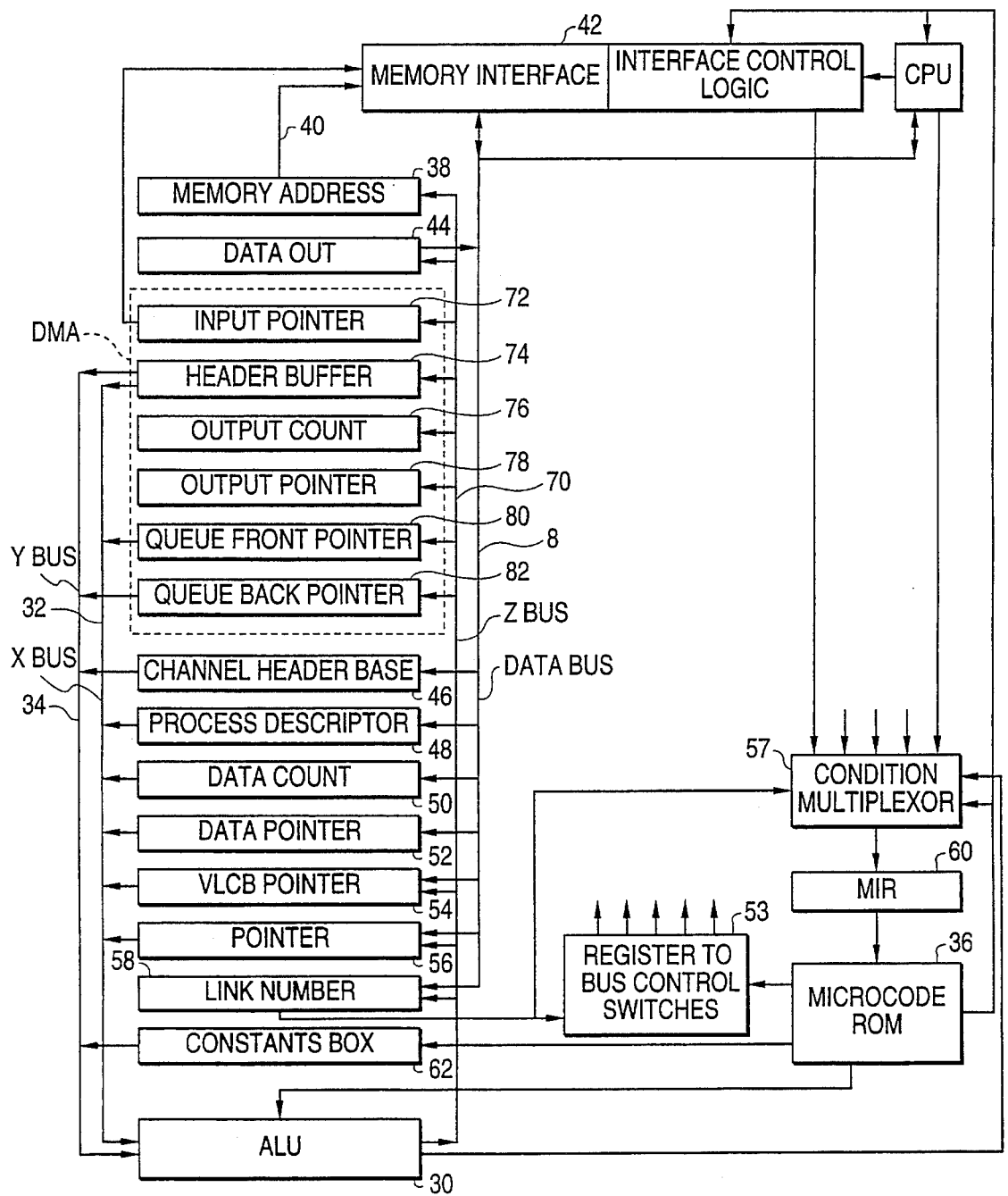
FIG. 4 is a block diagram of the structure of the communication control circuitry.

As shown in detail in FIG. 4, the communication controller includes an arithmetic logic unit (ALU) 30 and a plurality of data registers connected to an X bus 32, a Y bus 34, and the bidirectional data bus 8. Some of these registers are also connected to a Z bus 70. The operation of the registers and their interconnections with the busses is controlled by a plurality of switches controlled by signals derived from a micro-instruction program contained in a microcode ROM 36. Communication between the communication controller 6 and the memory 4 is effected via a unidirectional address path 40 from a memory address register 38 leading to a memory interface 42 to which the data bus 8 also leads. The data bus 8 is also used for the communication of values between registers in the processor 2 (FIG. 1) and registers in the communication controller 6. The registers of the communication controller are as follows:

Memory Address 38 A register containing the address of the memory location required.

Data Out 44 A register for supplying data to the memory or the processor on the data bus.

Channel Header Base 46 A register for holding the lowest header value which is expected. This value is subtracted from the value of arriving headers as part of the decoding process.

Process Descriptor 48 A register for holding the descriptor of the currently referenced process.

Data Count 50 A register for holding the length of a message to be sent or received.

Data Pointer 52 A register for holding a pointer to the location in memory from which data is to be transmitted or to which data is to be written.

VLCB Pointer 54 A register which holds a pointer to the currently referenced virtual link control block.

Pointer 56 A temporary register used for the construction of pointer values.

Link Number 58 A register which holds the number of the currently referenced link. The value in this register controls which register to bus control switches (designated generally at 53) are set and cleared and which signals to the links are affected by the output from the microcode ROM 36, and which signals from the links are multiplexed by a condition multiplexor 57 into the microcode instruction register 60.

MIR 60 A register whose value selects the micro-instruction word in the microcode ROM.

As the virtual link control block pointer VLCBP is used as a base from which different items in the block can be addressed, it is necessary to calculate offset values from the memory location indicated by the virtual link control block pointer. A constants box 62 is connected to the Y bus 34 to enable constant values to be placed on that bus under the control of the microcode ROM 36. These can be used in pointing to offset locations in a virtual link control block. The constants box 62 also enables mask values to be placed into the Y bus so that bit fields can be selected by means of the ALU 30, and bits in words held in the communication controller registers can be set and cleared. The constants box also enables the number of any physical (hard) link to be placed into the link number register 58 under the control of the microcode ROM 36.

DMAs

As shown in FIG. 3, each message link also includes one pair of DMAs 22, 24, some registers of which are connected to the X, Y, and Z busses 32, 34, 70 of the communication controller as shown in FIG. 4 which shows one link only for clarity surrounded by a broken line and designated DMA. The registers which are shown are as follows:

Input Pointer 72 A register which holds the pointer to the next byte to be written to by the input DMA 22.

Header Buffer 74 A register into which the header of an incoming packet is placed by the input DMA 22. After the header is decoded it holds a pointer to the control block of the virtual link.

Output Count 76 A register to hold the length of a sequence of bytes to be output by the output DMA 24.

Output Pointer 78 A register to hold a pointer to the start of a sequence of bytes to be output by the output DMA.

Queue Front Pointer 80 A pointer to the control block of the first virtual link queued to use the output DMA. If no virtual links are queued to use the output DMA, this contains a special value.

Queue Back Pointer 82 A pointer to the control block of the last virtual link queued to use the output DMA.

The structure of the input and output DMAs is shown more fully in block-diagram form in FIGS. 6 and 7.

Interaction of the Communications Controller and the DMAs

The communication controller 6 controls a plurality of these DMAs. The input DMA 22a accepts data from a communications device 20a, which in the preferred embodiment supplies data one byte at a time, and writes it into the memory 4 of the microcomputer. An output DMA 24b reads bytes of data from the memory 4 of the microcomputer and sends them to a communications device 20b, which in the preferred embodiment accepts data one byte at a time for transmission to another microcomputer. Each communications device 20 is connected to one input DMA 22a and one output DMA 24b.

Output DMA

Referring to FIG. 6, each output DMA contains four registers arranged in two pairs, a data pointer register 90 and a data count register 92, and a pointer register 94 and a count register 96. The first pair 90, 92 are connected to the Z-bus 70 of the communication controller as shown in FIG. 4. They are loaded by the communications controller with the pointer to the location in memory of the start of a sequence of bytes which are to be sent (register 90) and a count of the length in bytes of the sequence (register 92). The contents of the first pair of registers 90, 92 can be copied to the second pair of registers 94, 96 which control the transfer of data from the memory 4 to the communications device 20. The pointer register 94 is used to supply to a memory interface 100 the address of the next byte of data to be read, and is incremented after the byte has been read. The count register 96 holds the number of bytes still to be sent, and is decremented each time a byte of data is sent. It produces a signal to DMA control circuitry 102 when this count is zero.

To cause a packet to be sent by an output DMA, the communication controller 6 loads the pointer to the first byte of the packet header and the count of the length of the header into the first pair of registers 90, 92. The communication controller 6 then signals the output DMA via the DMA control circuitry 102 to copy the contents of the first pair of registers 90, 92, which have just been loaded, into the second pair 94, 96. The communication controller then loads the pointer to the first byte of the data and the count of the length of the data into the first pair of registers 90, 92 of the device. The communication controller then signals the output DMA to transmit the packet via the communications device 20.

Detailed Operation of the Output DMA

The first pair of registers 90, 92 copy their contents into the second pair of registers 94, 96 on receipt of the Copy signal from the control circuitry 102. The pointer register 94 supplies the address of the next byte to be output to the memory interface 100. It increments its value by one on receipt of the ByteSent signal from the control circuitry 102. The Count register 96 holds the count of the number of bytes still to be sent. It decrements by one on receipt of the ByteSent signal. It signals CountZero to the control circuitry 102 whenever it contains the value zero. A tokeniser 104 accepts bytes of data from the data bus 8. It signals the control circuitry 102 on GotData whenever it receives a byte of data from the data bus. It divides a byte of data into a pair of data tokens. It sends a token whenever it receives a signal on SendData. It sends an end of packet token whenever it receives a signal on SendEOP. The control circuitry registers its readiness to transmit a packet on Waiting.

When it first receives a signal from the communication controller 6 on Proceed the output DMA copies the data in the first pair of registers into the second pair, and then signals on Waiting. When it receives a second signal on Proceed, the output DMA first reads bytes from memory using the pointer in the second pair of registers 94, 96 until the count in the second pair of registers is reduced to zero. It then copies the contents of the first pair of registers 90, 92 into the second pair of registers 94, 96 and then reads bytes from memory using the pointer in the second pair of registers until the count in the second pair of registers is reduced to zero again. The output DMA then causes the communications device 20 to send an end-of-packet token. It then signals on Waiting to the communication controller 6.

Operation of the Input DMA

The structure of each input DMA is shown in block diagram form in FIG. 7. There are two registers, a header buffer 74 and an input pointer register 72, connected to the Z bus 70 of the communication controller as described previously. There is a Token Buffer 112, which can hold one token, which can either be a nibble of data or an end-of-packet token. This buffer 112 signals on the wire marked Got.EOP when it has received a token along the channel DataIn which is an end of packet token, and signals on the wire marked Got.token.b whenever it receives any other token. It transmits its contents to a switch 114 when it receives a signal on Send.t. When the signal Set.s is high the switch 114 transmits its input to the header buffer 74. Control logic 116 requests data from the communications device 20 and forces data into the header buffer 74 until the header buffer signals that it contains a complete packet header on the channel Full. The effective size of the header buffer is controlled by the associated flag 118, which is the packet header length flag. If this flag is set, packet headers are 2 bytes long and the header buffer 74 signals on the channel Full only when it contains four tokens. If this flag is not set, packet headers are 1 byte long and the header buffer signals on the channel Full only when it contains two tokens.

After receiving a signal from the header buffer 74 on channel Full, the control logic 116 requests another token from the communications device and waits for a signal from the token buffer 112. If this signal is on Got.token.b. the packet is a data packet, and the control logic 116 signals the communication controller 6 on DataPacket. If the signal from the token buffer 112 is on Got.EOP the packet is an acknowledgement packet, and the control logic 116 signals the communication controller on AckPacket. The communication controller decodes the header and writes a pointer into the input pointer register 72 of the input DMA, and then signals the control logic 116 on Acknowledge. If the packet was an acknowledgement packet the cycle now restarts. If the packet is a data packet the control logic 116 then unsets the switch 114 and causes data to flow into a Data Out register 120, from where it is written to memory via a memory interface 117. Each time a byte is written to memory, the control logic 116 signals the input pointer register 120 on Increment to cause it to advance the pointer to the next location. The control logic continues until it receives a signal on Got.EOP, when it signals the communication controller 6 on PacketEnd.

When a packet arrives via the communications device 20 the input DMA 22 inputs one or two bytes (depending on the setting of its flag 118) into its header buffer 74 and then signals to the communication controller to indicate that a packet has arrived. This channel carries the DataPacket, AckPacket and PacketEnd signals and is designated generally PacketArrive in FIG. 3. The input DMA then inputs the next data item from the communications device and at the same time waits for an acknowledgement from the communication controller. The communication controller decodes the header to obtain the identifier of a virtual link which it stores in the header buffer 74 of the input DMA, and then acknowledges receipt of the header on channel Acknowledge. If the data item that the input DMA inputted after the header of the packet was an end of packet marker, it signals the communication controller 6 that the packet is an acknowledgement packet, otherwise it signals that it is a data packet. The communication controller acknowledges receipt of this signal. If the packet is an acknowledgement packet, the transaction between the input DMA and the communication controller is now over. A new one will commence whenever another packet arrives via the communications device 20. If the packet is a data packet, the communication controller 6 reads the virtual link control block to obtain a location to place the data contained in the packet. This will either be a pointer to the data area of an inputting process or a pointer to the buffer associated with the virtual link. The communication controller writes this pointer into the input pointer register 72 of the input DMA, and then signals on channel PacketArrive. The input DMA then proceeds to write data received from the communications device using the contents of the input pointer register 72 as the address, incrementing the input pointer register each time a byte is written to memory, until it receives an end of packet token from the communications device. It then signals to the communications controller that the input is complete.

A state machine description of the output control circuitry of the output DMA is shown in Table I, and of the control logic of the input DMA in Table II.

Each communication device has four logical channels between it and the communications controller. The four channels form two pairs, one for each direction of data. Data channels carry data items which can be a nibble of data or an end of packet marker. Acknowledgement channels carry handshake signals which control the flow of data items on the other channel of the pair. In the preferred embodiment, the communication device can directly encode the end of packet marker in the protocol with which they communicate between themselves.

Example of Operation of the Preferred Embodiment

Figure 8:
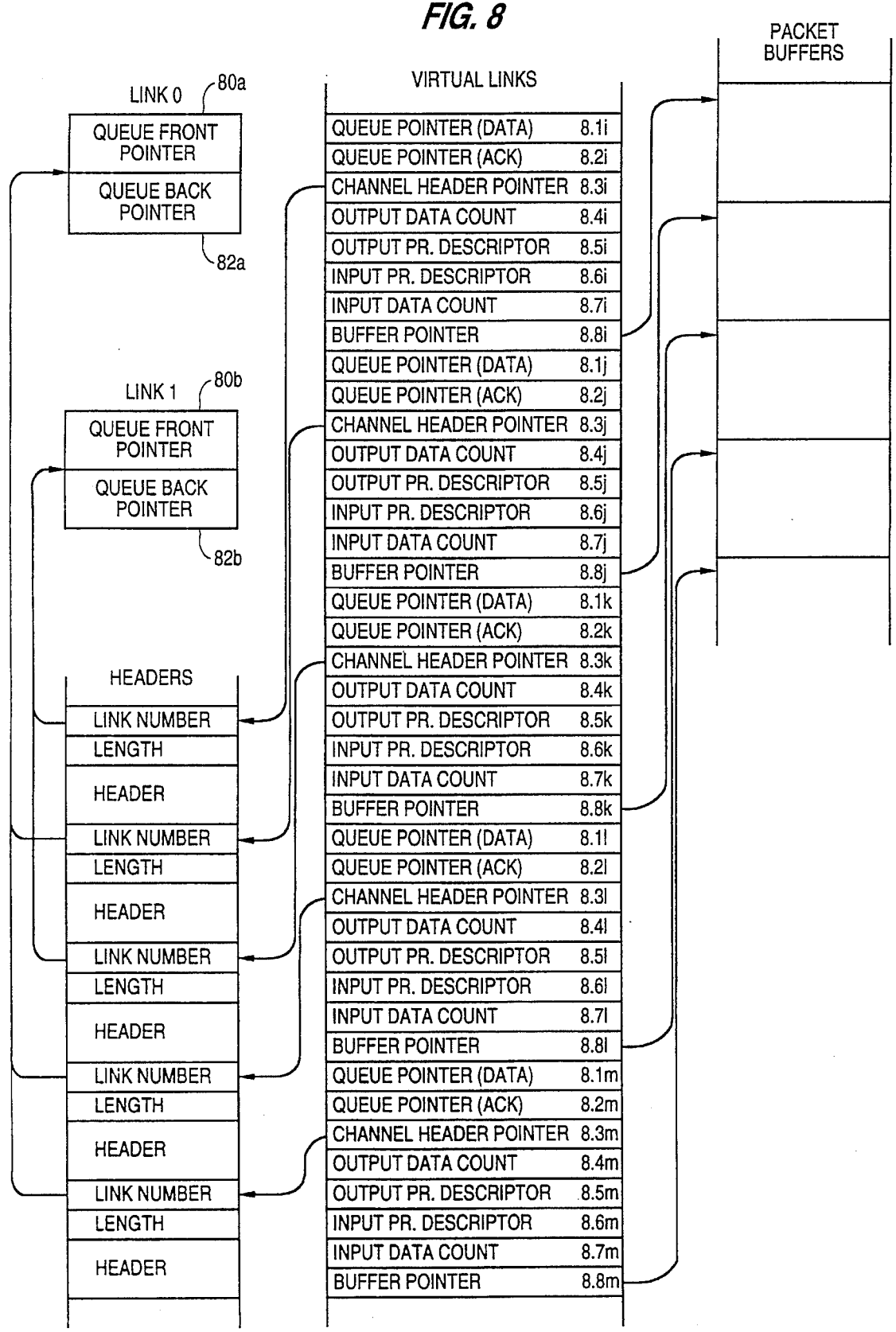
FIGS. 8, 9, 10, 11, 12, 13, and 14 separately show the successive states of the virtual links in an example of message inputting and outputting.

FIG. 8 shows the front and back queue pointers of two links (80a,b and 82a,b) and five virtual links in the memory of a microcomputer, following initialisation. The figure also shows how the channel header pointer 8.3 of each virtual link points to another area of memory which contains the number of the physical link to be used, the length of the header and the header itself. The link numbers are shown symbolically pointing to the corresponding physical link. In the Figure it can be seen that two of the virtual links use link 1 and the other three use link 0. Also shown in the Figure are the channel packet buffers which are pointed to by the buffer pointer 8.8. It will be appreciated that neither the virtual links nor the corresponding headers nor the corresponding channel packet buffers need be in adjacent regions of memory. They are shown occupying contiguous regions of memory for convenience, and because this represents a simple allocation strategy.

Figure 9:
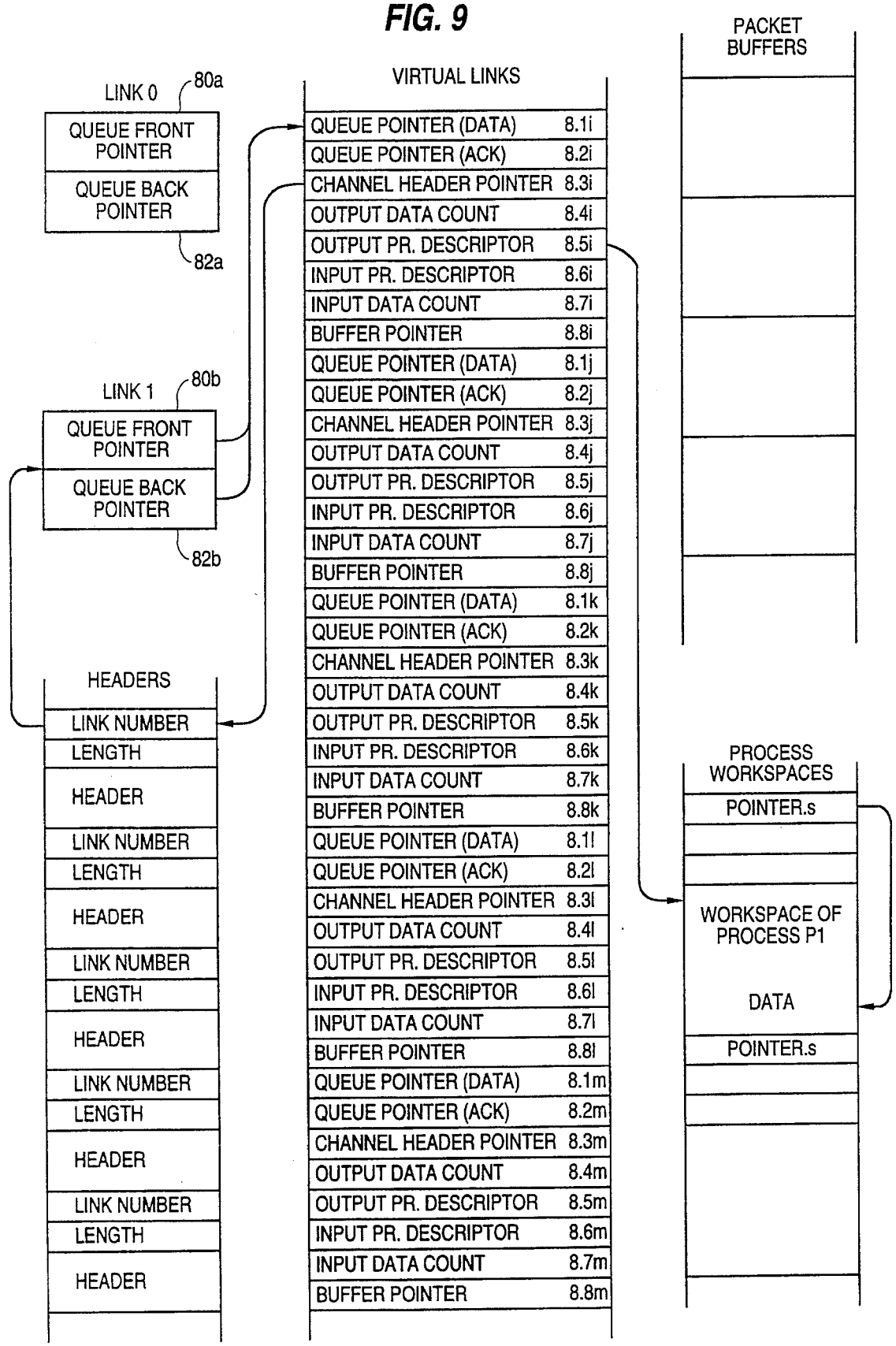

Now suppose that a process P1 on a microcomputer T1 performs an output using the virtual link VLi (memory locations 8.1i to 8.8i). Following the operation of the communications unit as described previously the queue registers and memory locations of the microcomputer T1 will be as shown in FIG. 9. Some of the arrows shown in the previous Figure have been omitted for clarity.

Figure 10:
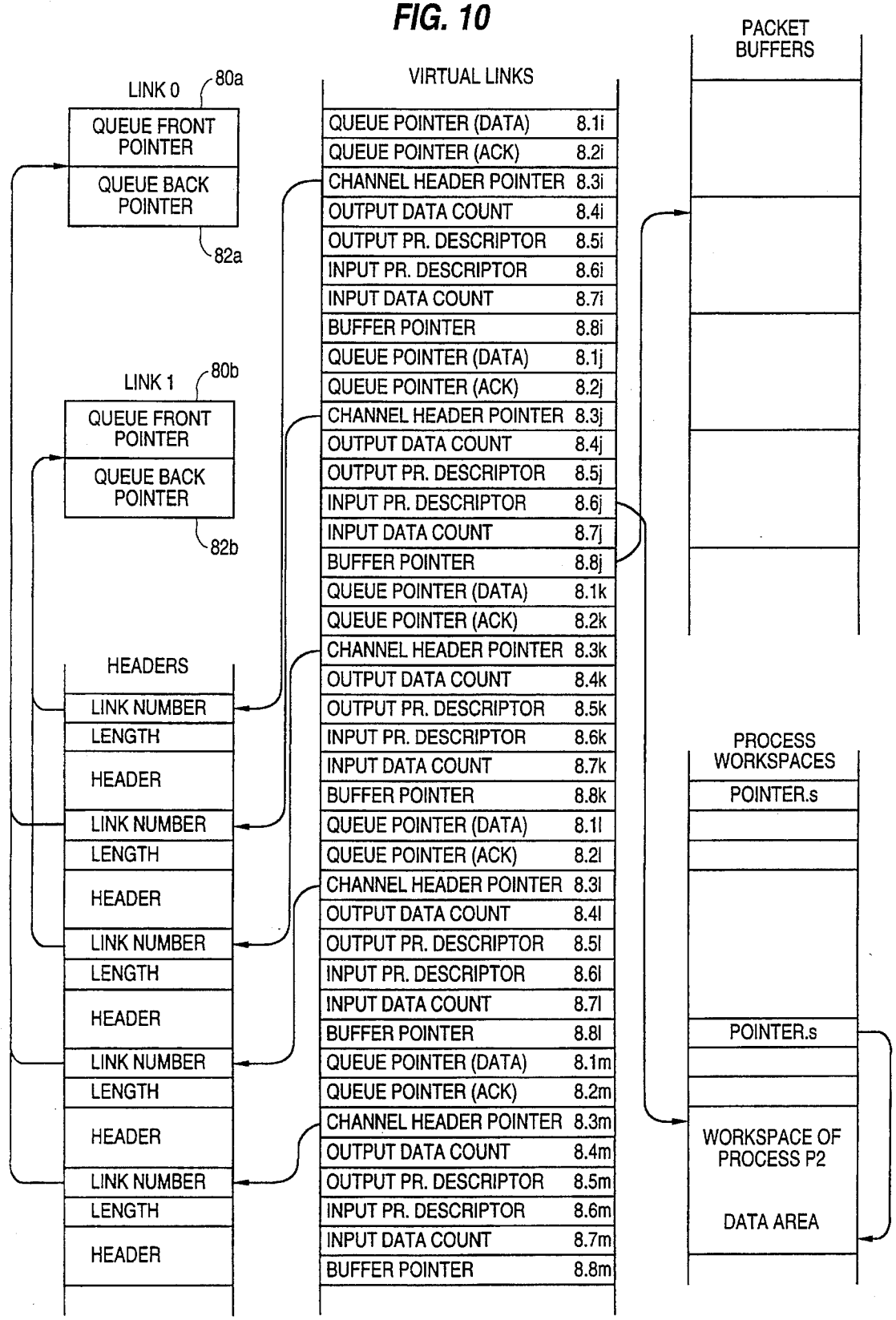

If another process P2 on a microcomputer T2 performs an input using the virtual link VLj (memory locations 8.1j to 8.8j) then following the operation of the communications unit as described previously the queue registers and memory locations of the microcomputer T2 will be as shown in FIG. 10.

Suppose that link 1 of microcomputer T1 is connected to link 0 of microcomputer T2, and that a message packet is sent from microcomputer T1 to microcomputer T2 as previously described. Suppose that virtual link VLi on microcomputer T1 and virtual link VLj on microcomputer T2 form a pair of virtual links as previously described. Then as the message packet arrives its header is decoded to give the address of virtual link VLj. If no input has been performed on this virtual link the packet is stored in the associated buffer in the memory of the microcomputer T2 as shown in FIG. 11.

Figure 12:
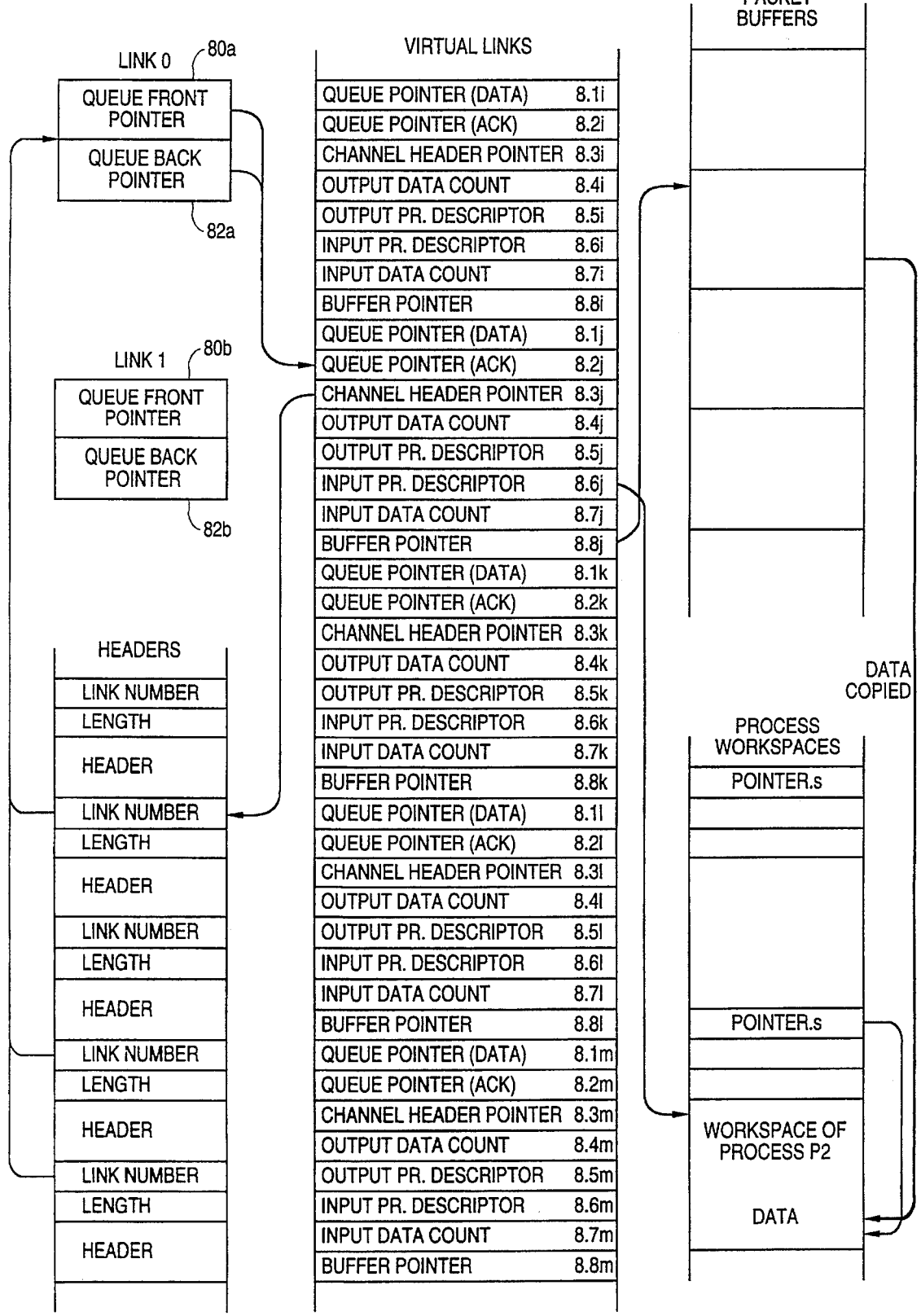

If an input is subsequently performed by the process P2 on the virtual link VLj, the state of the virtual links on microcomputer T2 will be shown in FIG. 12, assuming that the whole message is longer than one message packet (otherwise the process would have been rescheduled and the process descriptor in the virtual link VLj reset to NotProcess.p).

Figure 11:
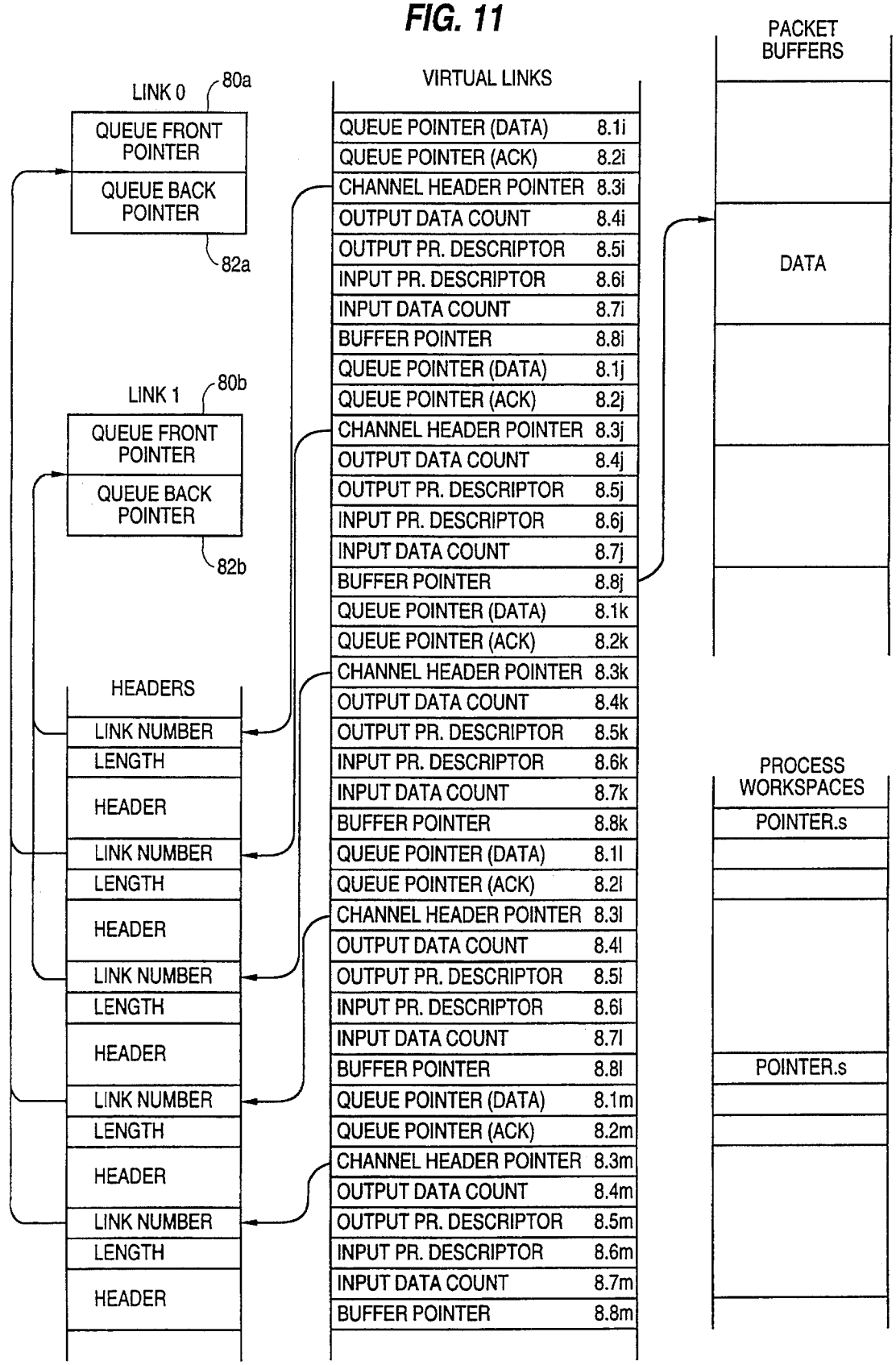
Figure 13:
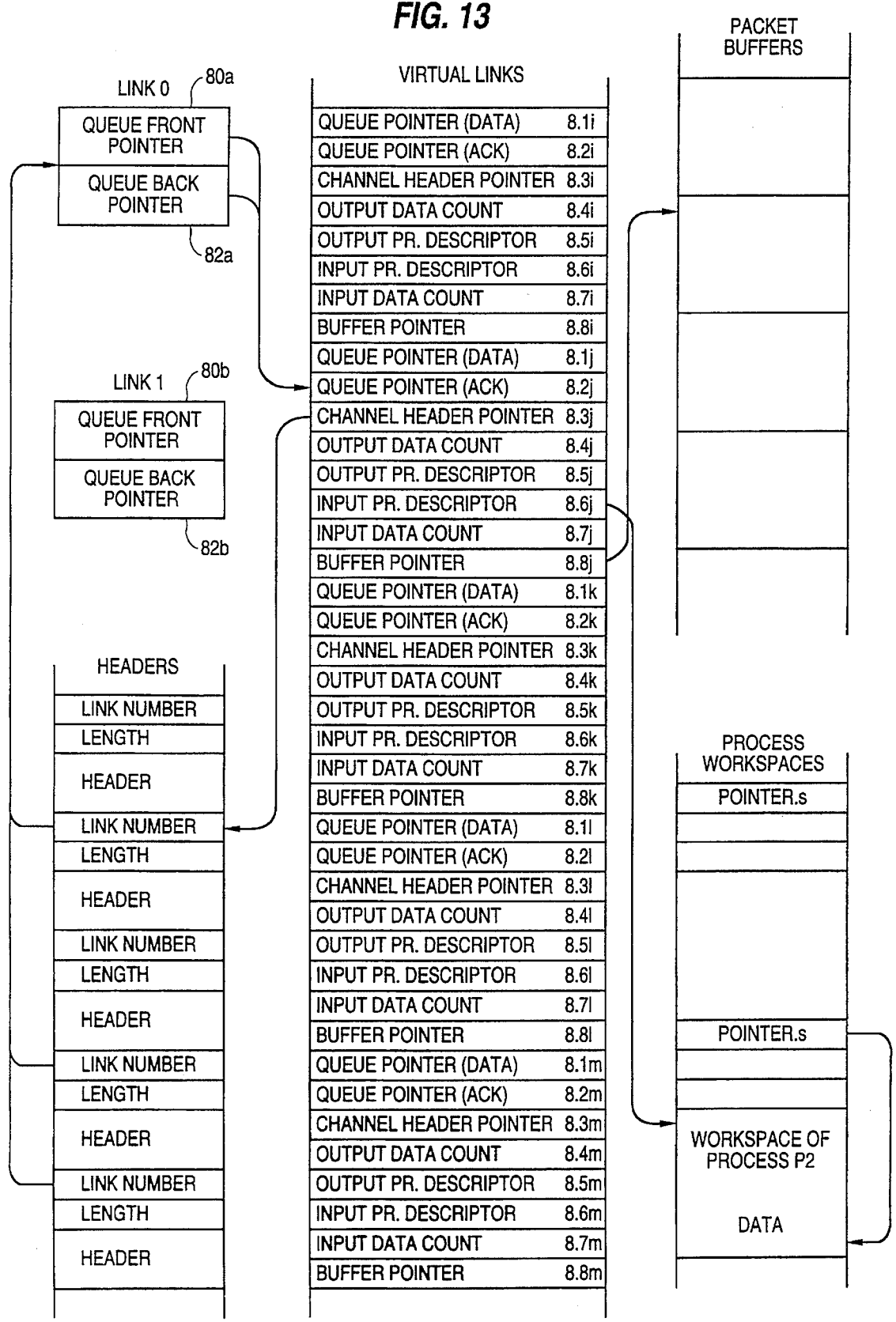

If the process P2 performs the input on virtual link VLj before the message packet arrives so that the queue registers and virtual links are as shown in FIG. 11, and a message packet subsequently arrives, the state of the queue registers and memory of the microcomputer T2 becomes as shown in FIG. 13.

Figure 14:
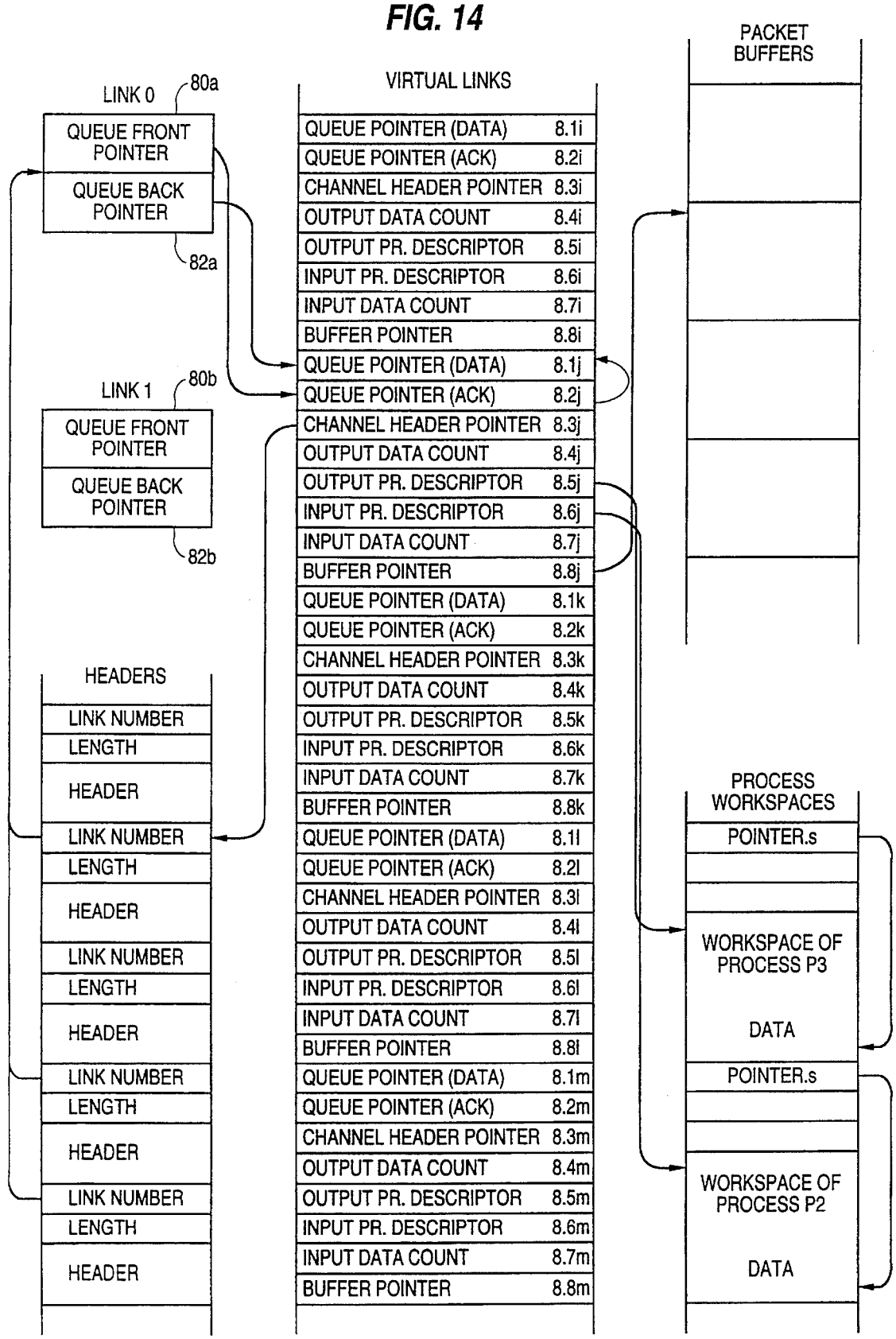

If another process P3 on microcomputer T2 performs an output on virtual link VLj before the acknowledgement packet has been sent, the state of the queue registers and virtual links of the microcomputer T2 will be as shown in FIG. 14.

There follows an explanation of the operation of the communication controller with reference to the OCCAM 2 language. The OCCAM language is described in The OCCAM 2 Reference Manual, which is hereby incorporated by reference.

TABLE I

| state | Input | Output | Next State |
| --- | --- | --- | --- |
| Ready1 | -Ready for Data | Waiting | wait1 |
|  | Ready for Data | Waiting | wait1.and.ready |
| wait1 | Proceed | Copy | Ready2.and.ready |
|  | Ready for Data |  | wait1.and.ready |
| Ready2 | -Ready for Data | Waiting | wait2 |
|  | Ready for Data |  | Ready2.and.ready |
| Ready2.and.ready |  | Waiting | wait2.and.ready |
| wait2 | Proceed | Read | wait.for.tok.and.req |
|  | Ready for Data |  | wait2.and.ready |
| wait2.and.ready | Proceed | Read | wait.for.tok |
| wait.for.tok.and.req | Ready for Data |  | wait.for.tok |
|  | Got Data |  | wait.for.req |
| wait.for.tok | Got Data | Send Data | send.second |
| wait.for.req | Ready for Data | Send Data | send.second |
| send.second | Ready for Data | Send Data | read.again |
|  |  | Byte Sent |  |
| read.again | -Count Zero | Read | wait.for.tok.and.req |
|  | Count Zero |  | final.req |
| final.req | Ready for Data | Send EOP | Ready1 |

TABLE II

| state | Input | Output | Next State |
|---|---|---|---|
| start | | Set.s<br>Request Data | go |
| go | Got.token.b | send.t | req.dat |
| req.dat | -Full | Request Data | go |
| | Full | Request Data | tok.or.Ak |
| tok.or.Ak | Got.EOP | Ack Packet | wait.for.Ak |
| | Got.token.b | -Set.s<br>Data Packet | send.tok.1 |
| wait.for.Ak | Acknowledge | | start |
| send.tok.1 | Acknowledge | Send.t | req.tok |
| req.tok | | Request Data | wait.for.tok |
| wait.for.tok | Got.token.b | Send.t | write |
| write | | write | wait.for.ok |
| wait.for.ok | ok | Request Data | wait.for.tok.or.eop |
| wait.for.tok.or.eop | Got.token.b | Send.t | req.tok |
| | Got.EOP | Packet End | wait.for.Ak |

Operation of the Communications Controller

The operation of the communications controller will now be described using the OCCAM language. The registers of the communications controller are represented by OCCAM variables as follows:

```
INT channel.header.base, process.descriptor, data.count, data.pointer :
INT vlcb.pointer, pointer, link.number :
```

The following array of boolean variables represents signals from the links to the condition multiplexor of the communications controller:

```
[NLinks]BOOL waiting :
```

The following boolean variables represents bits of the state of the communications controller:

```
BOOL data.packet :
[NLinks]BOOL inputs.proceeding :
```

The registers of the DMA devices which are connected to the busses of the communications unit are represented by arrays of variables. The elements of the arrays correspond to the registers belonging to particular links. The number of links is represented by the constant NLinks.

```
[NLinks]INT input.pointer, header.buffer, output.pointer :
[NLinks]INT queue.front.pointer, queue.back.pointer :
```

A set of basic operations will now be described using OCCAM procedures. These can be consider to be for expository purposes only, since the body of a procedure can always be substituted for an instance of it provided the procedure parameters are replaced by the actual parameters.

Various named constants are used in the following descriptions. In the preferred embodiment they could have the following values, for a 32-bit machine in which addresses are given in bytes:

```
VAL bytes.per.word IS 4 :      -- for a 32-bit machine
VAL data.packet.offset         IS 0*bytes.per.word :
VAL ack.packet.offset          IS 1*bytes.per.word :
VAL header.pointer.offset      IS 2*bytes.per.word :
VAL output.count.offset        IS 3*bytes.per.word :
VAL output.process.offset      IS 4*bytes.per.word :
VAL input.process.offset       IS 5*bytes.per.word :
VAL input.count.offset         IS 6*bytes.per.word :
VAL buffer.pointer.offset      IS 7*bytes.per.word :
VAL pointer.s.offset           IS (-3) *bytes.per.word :
VAL pd.mask            IS -1 : -- masks off the bottom bit
VAL offset.mask        IS bytes.per.word :
VAL upper.bits.mask    IS ~((2*bytes.per.wored) - 1) :
VAL max.packet.size    IS 32 : -- 32 bytes
VAL null IS MOSTNEG INT: -- using most negative integer as the base of memory
VAL NotProcess.p IS MOSTNEG INT: -- not process allowed at the base of memory
VAL VLinkBase IS null + (100*bytes.per.word) -- table starts at 100th word
```

Various operations of forming an address, placing the address in the Memory Address register, placing data to be written in the Data Out register (in the case of a write) and signaling the memory interface are represented by the following procedures:

```
PROC ReadWord (INT register, VAL INT address)
    -- reads a word of data at location address into the register
:
PROC WriteWord (INT register, VAL INT address)
    -- writes the contents of the register into location address
:
PROC ReadFromVLCB (INT register, VAL INT offset)
    -- reads from the given offset in the current virtual link control block
    -- into the register
    ReadWord (register, vlcb.pointer + offset)
:
PROC WriteToVLCB (INT register, VAL INT offset)
    -- writes the contents of register into an offset from the current vlcb
    WriteWord (register, vlcb.pointer + offset)
:
PROC ReadDataPointer (INT register)
    -- read the pointer from the workspace of the current process
    -- at a fixed offset
    ReadWord (register, (process.descriptor /    pd.mask) + pointer.s.offset)
:
PROC WriteDataPointer (INT register)
    -- write to the workspace of the current process at a fixed offset
    WriteWord (register, (process.descriptor /    pd.mask) + pointer.s.offset)
:
```

This procedure threads a virtual link table entry onto the output queue for link 'link.number'. We assume that this virtual link is not already queued in this mode. The offset is the offset within each virtual link control block of the queue link word. It determines whether the virtual link is to be queued to send a data packet or an acknowledge packet.

```
PROC EnQueue (VAL INT offset)
    SEQ
    IF
        queue.front.pointer[link.number] = null -- queue is empty
            queue.front.pointer[link.number] := vlcb.pointer + offset
        queue.front.pointer[link.number] <> null
            -- set the item at the back of the queue to point at the new item
            WriteWord (vlcb.pointer + offset, queue.back.pointer[link.number])
        queue.back.pointer[link.number] := vlcb.pointer + offset
```

This procedure takes the item from from front of the output queue for link 'link.number.'. It assumes the queue is not empty when it is called.

```
PROC DeQueue ( )
    SEQ
        vlcb.pointer := queue.front.pointer[link.number]
        -- use the 8-word-alignment of the vlcbs to distinguish the packet type
        IF
            (vlcb.pointer /    offset.mask) = 0
                data.packet := TRUE
            TRUE
                data.packet := FALSE
        IF
            queue.front.pointer[link.number] = queue.back.pointer[link.number]
                -- this virtual link is the last in the queue
                queue.front.pointer[link.number] := null
            TRUE
                -- set the front pointer to point at the next in the queue
                SEQ
```

```
                    -- at this point vlcb.pointer contains the offset
                    ReadFromVLCB (queue.front.pointer[link.number], 0)
                    WriteToVLCB    (null, 0)
    -- set the address to the top of the block
    vlcb.pointer := vlcb.pointer /    (upper.bits.mask)
:
```

The following procedure reads the number of the physical link associated with the current virtual link from the data pointed to by the channel header pointer:

```
PROC GetLinkNumber ( )
    SEQ
        ReadFromVLCB (pointer, header.pointer.offset)
        ReadWord (link.number, pointer)
:
```

The communication between the communications unit and the CPU is represented by OCCAM channels. Communication on OCCAM channels is synchronised, which means that a single OCCAM communication corresponds to a request/response pair as previously described. The communication of data values also involves the use of the data bus of the microcomputer. The combination of a request, a response and a data transfer is represented by an OCCAM communication on the following channels:

```
CHAN OF INT from.cpu.to.communications.unit :
CHAN OF INT from.communications.unit.to.cpu :
```

The signals between the communications controller and the DMA devices are similarly represented by the following arrays of OCCAM channels:

```
[NLinks]CHAN OF BOOL data.packet, ack.packet, packet.end, acknowledge :
[NLinks]CHAN OF BOOL proceed :
```

The following procedure loads the pointer to the header of the packet and the count of its length into the DMA output device, assuming that the pointer register already contains me address of the start of the header:

```
PROC SetUpHeader ( )
    SEQ
        pointer := pointer + word -- increment the pointer by one word
        ReadWord (output.count[link.number], pointer)
        -- set the output pointer to the next word, where the header starts
        output.pointer[link.number] := pointer + word
        proceed[link.number] ! TRUE -- causes the registers to be copied
:
```

The following procedure works out the length of the next packet, and decrements the stored count by that amount. If the count is still non-zero, it updates the stored pointer in the process workspace as well. By always doing this before the header is sent we ensure that, if an acknowledge packet comes back before the packet is completely sent, the next packet can be sent (or the process rescheduled) with the correct data. It then causes the packet of data to be sent.

```
PROC SendDataPacket ( )
    SEQ
        SetUpHeader ( )
        output.pointer[link.number] := data.pointer
        IF
```

```
        (data.count <= max.packet.size)
            output.count[link.number] := data.count -- send everything left
        TRUE
            SEQ
                -- send a full size packet, and update the pointer
                output.count[link.number] := max.packet.size
                data.pointer := output.pointer[link.number] + max.packet.size
                WriteDataPointer (data.pointer)
        -- update the data.count; if it is now zero, the process will be
        -- rescheduled when the ack arrives.
        data.count := data.count - output.count[link.number]
        WriteToVLCB (data.count, output.count.offset)
        proceed[link.number] ! TRUE -- starts transmission
        -- waiting[link.number] will now become FALSE
:
```

The following piece of OCCAM shows how the communication controller responds to a request from the CPU to send a message:

```
-- a request to output has been received from the CPU
SEQ
    -- get the data for the message from the cpu
    from.cpu.to.communications.unit ? vlcb.pointer
    from.cpu.to.communications.unit ? data.pointer
    from.cpu.to.communications.unit ? data.count
    from.cpu.to.communicaitons.unit ? process.descriptor
    GetLinkNumber ( )
    IF
        -- the DMA output device is idle and nothing is queued to use it:
        waiting[link.number] AND (queue.front.pointer[link.number] = null)
            SEQ
                WriteToVLCB (process.descriptor, output.process.offest)
                SendDataPacket ( )
        TRUE
            --    queue the packet
            SEQ
                -- thread the vlink onto the queue
                EnQueue (data.packet.offset)
                -- record the message data
                WriteDataPointer (data.pointer)
                WriteToVLCB (data.count,           output.count.offset)
                WriteToVLCB (process.descriptor,   output.process.offset)
```

The following procedure shows how the DMA output device is set up to send an acknowledge packet (i.e. one with no data):

```
PROC SendAcknowledgePacket ( )
    SEQ
      GetLinkNumber ( )
      IF
        -- the DMA output device is idle and nothing is queued to use it:
        waiting[link.number] AND (queue.front.pointer[link.number] = null)
            SEQ
            SetUpHeader ( )
            output.count[link.number] := 0
            proceed[link.number] ! TRUE -- starts transmission
            -- waiting[link.number] will now become FALSE
        TRUE
            -- store the information that the acknowledge is wanted
            EnQueue (ack.packet.offset)
:
```

The following procedure returns a process descriptor to the cpu so that it can subsequently be executed once more.

```
PROC RescheduleProcess ( )
    SEQ
        from.communications.unit.to.cpu ! process.descriptor
:
```

The following piece of OCCAM shows how the communiation controller responds to a request from the CPU to receive a message:

```
SEQ
    from.cpu.to.communications.unit ? vlcb.pointer
    from.cpu.to.communications.unit ? data.pointer
    from.cpu.to.communications.unit ? data.count
    from.cpu.to.communications.unit ? process.descriptor
    -- the cpu now waits for a further communication
    ReadFromVLCB (pointer, buffer.pointer.offset)
    -- check whether a packet is already arriving on the same virtual link
    link.number := 0
    WHILE ((pointer/    1 = 0) AND (link.number < NLinks))
    IF
        input.proceeding[link.number] AND
            (header.buffer[link.number] = vlcb.pointer)
            SEQ
            pointer := pointer    / 1 -- terminates the loop
            -- wait for the packet to be written to the buffer
            packet.end[link.number] ? finished
            input.proceeding[link.number] := FALSE
        TRUE
            link.number := link.number + 1
    -- if there is now a packet of data in the virtual link buffer this is
    -- indicated by the bottom bit of the pointer being set to 1
    IF
    (pointer /    1) = 1 -- bottom bit set
        SEQ
        pointer := pointer >< 1 -- unset bottom bit of pointer
        -- ask the cpu to move data from the buffer
        from.communications.unit.to.cpu ? pointer
        IF
            data.count > max.packet.size
                SEQ -- there must be a full-size packet in the buffer
                    -- ask the cpu to move it all
                    from.communications.unit.to.cpu ! max.packet.size
                    WriteDataPointer (data.pointer + max.packet.size)
                    WriteToVLCB     (data.cont - max.packet.size, input.count.offset)
                    WriteToVLCB     (process.descriptor, input.process.offset)
            data.count <= max.packet.size -- the message is complete
                SEQ -- ask the cpu to move the whole message
                    from.communications.unit.to.cpu ! data.count
                    RescheduleProcess ( )
        WriteToVLCB (pointer, buffer.pointer.offset)
        SendAcknowledgePacket ( )
    (pointer /    1) = 0 -- bottom bit not set; no packet seen so far
        SEQ
        from.communications.unit.to.cpu ! ack.io -- allow the CPU to proceed
        WriteDataPointer (data.pointer)
        WriteToVLCB (data.count, input.count.offset)
        WriteToVLCB (process.descriptor, input.process.offset)
```

The following procdure decodes the packet header to obtain the address of the control block of the virtual link to which the packet is addressed.

Note that (header.buffer[link.number] - channel.header.base) is the number of the virtual link addressed, i.e. a block offset from the base of the virtual link table. Thus this must be must multiplied by 8 (equivalently shifted left by 3) to get a word offset from the base of the table. Adding the address of the base of the table gives the actual address.

```
PROC DecodeHeader ( )
    SEQ
    header.buffer[link.number] :=
        ((header.buffer[link.number] - channel.header.base) << 3) + VLinkBase
    vlcb.pointer := header.buffer[link.number]
```

The following piece of OCCAM shows the the communications controller responds when one of the DMA input devices receives an ack packet:

```
SEQ
    -- find out how much of the message remains to be sent
    ReadFromVLCB (data.count, output.count.offset)
    IF
    data.count = 0 -- last packet has been sent
        SEQ
            ReadFromVLCB (process.descriptor, output.process.offset)
            WriteToVLCB (NotProcess.p, output.process.offset)
            RescheduleProcess ( )
    TRUE -- send or queue another packet
        SEQ
            GetLinkNumber ( )
            IF
                waiting[link.number] AND (queue.front.pointer[link.number] = null)
                    SEQ
                        ReadDataPointer (data.pointer)
                        SendDataPacket ( )
                TRUE
                    EnQueue (data.packet.offset)
```

The following piece of OCCAM shows the the communications controller responds when one of the DMA input devices receives a data packet.

The bottom bit of header.buffer[link.number] is used to determine whether the inputting process (if any) should be rescheduled when the packet input finishes. Since there is an input ready on this channel, we can assume no other input will be done on it, so we can safely corrupt the value of this register without spoiling the comparisons done when an input is performed.

The following piece of OCCAM shows how the communications controller responds to the 'Packet End' signal from one of the DMA input devices:

```
SEQ
    --   check whether an input is ready
    --   read process descriptor and header poionter from vlcb
    ReadFromVLCB (pointer, header.pointer.offset)
    ReadFromVLCB (process.descriptor, input.process.offset)
    IF
    process.descriptor = NotProcess.p     -- no input is ready
        --   tell the DMA input device to write to the buffer
        SEQ
            ReadFromVLCB (input.pointer[link.number], buffer.pointer.offset)
            -- record that the buffer is not empty
            WriteToVLCB (input.pointer[link.number]    / 1, buffer.pointer.offset)
            acknowledge[link.number] ! TRUE -- allow input to proceed
            input.proceeding[link.number] := TRUE
    process.descriptor <> NotProcess.p -- an input is ready on this channel
        SEQ
            --   read pointer from the process workspace
            ReadDataPointer (input.pointer[link.number])
            acknowledge[link.number] ! TRUE -- allow input to proceed
            input.proceeding[link.number] := TRUE
            ReadFromVLCB (data.count, input.count.offset)
            --   update pointer and count
            IF
                data.count > max.packet.size
                    SEQ
                    -- write incremented pointer into workspace
                    WriteDataPointer (data.pointer + max.packet.size)
                    -- write data.count into vlcb
                    WriteToVLCB (data.count - max.packet.size, input.count.offset)
                TRUE -- no more packets to be received
                    --   record that this is the last packet
                    header.buffer[link.number] := header.buffer[link.number]    / 1
            --   send or queue an acknowledge packet
            GetLinkNumber ( )
            IF
                waiting[link.number] AND (queue.front.pointer[link.number] = null)
                    SendAcknowledgePacket ( )
                TRUE
                    EnQueue (ack.packet.offset)
```

```
SEQ
    acknowledge[link.number] ! TRUE
    IF
    (header.buffer[link.number] /    1) = 1 -- this was the last packet
        -- reschedule process
        SEQ
            -- make the relevant control block current
            vlcb.pointer := header.buffer[link.number] /    upper.bits.mask
            ReadFromVLCB (process.descriptor, input.process.offset)
            -- reset descriptor in the control block
            WriteToVLCB (NotProcess.p, input.process.offset)
            RescheduleProcess ( )
    TRUE
        SKIP
    input.proceeding[link.number] := FALSE
```

The following piece of OCCAM shows how the communications controller responds to the 'Waiting' signal from one of the DMA output devices:

```
IF
    queue.front.pointer[link.number] = null -- nothing on the queue
        SKIP   -- waiting[link.number] remains TRUE
    TRUE
        SEQ
            DeQueue ( )    -- take the first item from the queue
            ReadFromVLCB (pointer, header.pointer.offset)
            IF
                data.packet
                    -- read data from memory and send packet
                    SEQ
                        ReadFromVLCB (process.descriptor,      output.process.offset)
                        ReadDataPointer (data.pointer)
                        ReadFromVLCB (data.count,              output.count.offset)
                        SendDataPacket ( )
                TRUE -- send an acknowledge packet
                    SEQ
                        SetUpHeader ( )
                        output.count[link.number] := 0
                        proceed[link.number] ! TRUE -- starts transmission
                        -- waiting[link.number] will now become FALSE
```

We claim:

1. A computer device comprising a processor for executing a plurality of concurrent processes each comprising a sequence of instructions, memory including RAM, at least one message link having an input and an output for connection to a device separate from said computer device and for transmitting message packets sequentially between the computer device and said separate device, said memory providing a plurality of addressable storage locations comprising a plurality of addressable virtual communication links, each virtual communication link comprising an address storage location which stores information defining a predefined destination of any message packet to be sent on that virtual communication link, and communication control circuitry coupled to said processor, to said memory, and to said message link, said communication control circuitry being effective:

(i) in response to execution of a message instruction by said processor to address a selected one of said virtual communication links having stored destination information identifying said predefined destination of a message to be transmitted and to load into the selected virtual communication line information regarding the message to be effected via said selected virtual communication link; and (ii) to control sequential transmission through said one message link of message packets relating to the plurality of virtual communication links, whereby when a message packet is to be transmitted a destination header comprising the destination information stored in the selected one of said virtual communication links is added to the message packet.

2. The computer device as claimed in claim 1 in which said memory also provides a plurality of communication channels to permit concurrent processes for execution by said processor to communicate one with another.

3. The computer device as claimed in claim 2 in which the behavior of a memory location as a virtual link or as a communication channel is determined by the address of the memory location.

4. The computer device as claimed in claim 3, wherein the communication channels permit synchronised process to process communication between the concurrent processes of said processor.

5. The computer device as claimed in claim 1 in which the communication control circuitry operates to permit messages to be transferred between one of said plurality of concurrent processes which is being executed by said processor and a process being executed by a processor of the separate device in such a way as to implement synchronized process to process communication.

6. The computer device as claimed in claim 5 in which the communication control circuitry operates to implement synchronised process to process communication between processes executed by the processor on said computer device and processes executed by a processor of said separate device.

7. The computer device as claimed in claim 1, which comprises an integrated circuit on a single chip providing said processor, said memory and said communication control circuitry.

8. The computer device as claimed in claim 1 wherein the communication control circuitry is operable to divide a message into a plurality of message packets each having a length which is not greater than a predetermined length.

9. The computer device as claimed in claim 8 wherein the communication control circuitry includes a data count register for holding the length of a message remaining to be transmitted via the selected virtual communication link.

10. The computer device as claimed in claim 8 wherein the plurality of message packets are transmitted via the same virtual communication link and have a common destination as defined by the destination information stored in the selected one of the said virtual communication links, said message packets being transmitted through said one message link interleaved with message packets being transmitted via others of said virtual communication links.

11. The computer device as claimed in claim 8 wherein each virtual communication link includes a storage location for storing output data count representing the length of a message remaining to be sent via that virtual communication link.

12. The computer device as claimed in claim 1 wherein each virtual link has a process identification storage location for identifying a process descriptor of one of said plurality of concurrent processes which has executed a message instruction to exchange a message packet.

13. The computer device as claimed in claim 12 wherein the process identification storage location stores a pointer to a work space of a process.

14. The computer device as claimed in claim 1 wherein each virtual communication link includes a storage location which is used to form a queue for transmission via said one message link.

15. The computer device as claimed in claim 1 wherein each virtual communication link includes a process identification storage location for identifying a process awaiting receipt of a message on that virtual communication link.

16. The computer device as claimed in claim 1 or 15 wherein each virtual communication link includes a storage location for an input data count representing the length of a message to be received by that virtual communication link.

17. The computer device as claimed in claim 1 wherein the virtual communication link includes a storage location identifying a region in said memory where an incoming message packet may be stored.

18. The computer device as claimed in claim 1 wherein said memory forms part of the main memory associated with the processor.

19. The computer device as claimed in claim 1 wherein the communication control circuitry includes a data count register for holding the length of a message remaining to be transmitted via the selected virtual communication link.

20. A method of executing concurrent processes in a computer device having a processor, memory including RAM, communication control circuitry, and at least one message link having an input and an output connected to a device separate from the computer device for transmission of message packets between the computer device and said separate device, the method comprising the steps of:

allocating a plurality of addressable memory locations as virtual communication links, storing at an address storage location of each virtual communication link information defining the predefined destination of any message packet to be sent on that virtual communication link, executing a sequence of instructions including a plurality of message instructions;

operating said communication control circuitry in response to execution of each of said message instructions to address a selected virtual communication link having stored destination information identifying said predefined destination of a message to be transmitted and to load into said selected virtual communication link information regarding the message to be effected; and using said communication control circuitry to effect sequential transmission of messages through one said message link, by forming a message packet including the destination information derived from the selected virtual communication link.

21. The method as claimed in claim 20 wherein said communication control circuitry operates in response to receipt of a message packet by a message link to address a selected virtual communication link dependent on the content of the message packet.

22. The method as claimed in claim 20 when used to execute concurrent processes on computer devices interconnected to form a network, the method further comprising providing on each computer device information which identifies for each virtual link on that computer device an associated virtual link on a separate computer device.

23. The method as claimed in claim 22 wherein the destination information of each message packet is an address portion identifying its associated virtual link, said address portion being used to route messages.

24. A method as claimed in claim 20 further including the step of forming a queue of virtual communication links waiting to use a message link by loading into each virtual communication link a pointer to the next virtual communication link thereby forming a linked list.

25. The method as claimed in claim 24 wherein each virtual link is effective to input and output both data packets and corresponding acknowledgement packets and each virtual link waiting to use a message link selectively adopts one of two positions in the linked list, a first position relating to the output of a data packet and a second position relating to the output of an acknowledgement packet.

26. The method as claimed in claim 20 in which each message link is arranged to provide synchronised process to process communication wherein each message packet which is output by execution of a process on said computer device using one virtual link is acknowledged by an inputting device before transmission of a further message packet using the same virtual link.

27. The method as claimed in claim 26 in which each virtual link has a state indicator to indicate that the virtual link has been used to effect transmission of a message, no further messages being transmitted by the virtual link until the state indicator has been altered by receipt of an acknowledgement by the virtual link.

28. The method as claimed in claim 27 in which each virtual link is arranged to effect both input of data packets and output of corresponding acknowledgement packets.

29. The method as claimed in claim 28 wherein each virtual link is arranged to effect input and output of both data packets and corresponding acknowledgement packets.

30. The method as claimed in claim 26 wherein when all of the message packets of a message have been output and acknowledged, information regarding the process which output the message is returned to said processor of the computer device so that the process can continue to be executed.

31. The method as claimed in claim 20 in which each message packet is encoded for transmission as at least one bit sequence in which each bit sequence contains an equal number of ones and zeros, said bit sequences being of a predetermined bit length and forming a finite set of the permutations of equal numbers of ones and zeros, wherein a first subset of said finite set is selected for use as data codes and a second, distinct, subset of said finite set is selected for use as control codes.

32. The method as claimed in claim 31 in which each bit sequence has a length of six bits, comprising three ones and three zeros, wherein sixteen permutations are selected for use as data codes and four permutations are selected for use as control codes.

33. The method according to claim 20 wherein each message packet is encoded for transmission in bit sequences each six bits long, and wherein each bit sequence contains three ones and three zeros, sixteen combinations of which are taken to represent different values of four bits of data assigned as data codes, one combination is used to represent an end of message packet code and one combination is used to control the flow of data codes and end of message packet codes in the opposite direction.

34. The method as claimed in claim 20 wherein the message to be effected via the selected virtual communication link is divided by the communication control circuitry into a plurality of message packets each having a length which is not greater than a predetermined length.

35. The method as claimed in claim 34 wherein message packets from different messages are transmitted by their respective selected virtual communication links in an interleaved fashion through said one message link of said computer device.

36. A network comprising a plurality of computer devices, each computer device including a processor for executing a plurality of concurrent processes each comprising a sequence of instructions, memory including RAM, at least one message link having an input and an output for connection between said computer devices and for transmitting message packets sequentially between said computer devices, said memory providing a plurality of addressable storage locations comprising a plurality of addressable virtual communication links each virtual communication link comprising an address storage location which stores information defining a predefined destination of any message packet to be sent on that virtual communication link, and communication control circuitry coupled to said processor, to said memory, and to said message link, said communication control circuitry being effective:

(i) in response to execution of a message instruction by said processor to address a selected one of said virtual communication links having stored destination information identifying said predefined destination of a message to be transmitted and the load into the selected virtual communication link information regarding the message to be effected via said selected virtual communication link; and (ii) to control sequential transmission through said one message link of message packets relating to the plurality of virtual communication links, whereby when a message packet is to be transmitted a destination header comprising the destination information stored in the selected one of said virtual communication links is added to the message packet.

37. A network as claimed in claim 36 comprising a plurality of routing switches for routing messages between said computer devices.

38. A method of executing concurrent processes in a computer device having a processor, memory including RAM, communication control circuitry, and at least one message link having an input and an output connected to a device separate from the computer device for transmission of message packets between the computer device and said separate device, the method comprising the steps of:

allocating a plurality of addressable memory locations of said memory as virtual communication links;

storing at an address storage location of each virtual communication link information defining a predefined destination of any message packet to be sent on that virtual communication link;

executing a sequence of instructions including a plurality of message instructions;

operating said communication control circuitry in response to execution of each of said message instructions to address a selected virtual communication link having stored destination information identifying said predefined destination of a message to be transmitted and to load into said selected virtual information link information regarding the message to be effected; and using said communication control circuitry to effect sequential transmission of messages through one said message link, by forming a message packet including the destination information derived from the selected virtual communication link, wherein when a message packet is received by said computer device the communication control circuitry determines whether the message packet is a data packet or an acknowledgement packet and acts in response to a data packet addressed to a selected virtual communication link to effect transmission of an acknowledgement packet via said selected virtual communication link and in response to an acknowledgement packet addressed to a selected virtual communication link to effect transmission of a data packet if any data packets remains to be sent via said selected virtual communication link.

* * * * *

UNITED STATES PATENT AND TRADEMARK OFFICE
CERTIFICATE OF CORRECTION

PATENT NO. : 5,495,619

DATED : February 27, 1996

INVENTOR(S) : Michael D. May et al.

It is certified that error appears in the above-identified patent and that said Letters Patent is hereby corrected as shown below:

Title Page: Insert --Assignee: Inmos Limited, Bristol, England--

Column 33, Line 63, "line" should read --link--

Column 37, Line 54, "and the" should read --and to --.

Column 38, Line 35, "virtual information" should read --virtual communication--

Signed and Sealed this

First Day of October, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,495,619
DATED : February 27, 1996
INVENTOR(S) : Michael D. May, Brian J. Parsons, Peter W. Thompson, and Christopher P. H. Walker It is certified that error appears in the above-identified patent and that said Letters Patent is hereby corrected as shown below:

On the title page

[73] Assignee: SGS-Thomson Microelectronics Limited
Bucks, United Kingdom

Signed and Sealed this

Seventeenth Day of November, 1998

Attest:

BRUCE LEHMAN

*Attesting Officer*  *Commissioner of Patents and Trademarks*